(12) United States Patent
Ouderkirk et al.

(10) Patent No.: US 7,356,229 B2
(45) Date of Patent: Apr. 8, 2008

(54) REFLECTIVE POLARIZERS CONTAINING POLYMER FIBERS

(75) Inventors: Andrew J. Ouderkirk, Woodbury, MN (US); Richard C Allen, Lilydale, MN (US); Patrick R. Fleming, Lake Elmo, MN (US); Diane North, Inver Grove Heights, MN (US); Andrew T. Ruff, Mendota Heights, MN (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 303 days.

(21) Appl. No.: 11/068,157

(22) Filed: Feb. 28, 2005

(65) Prior Publication Data

US 2006/0193577 A1    Aug. 31, 2006

(51) Int. Cl.
*G02B 6/04* (2006.01)
*G02B 6/00* (2006.01)

(52) U.S. Cl. .................. 385/115; 385/11; 385/123; 385/141; 385/146

(58) Field of Classification Search .......... 385/2, 385/8, 40, 41, 42, 123, 125, 120, 121, 115, 385/116, 11, 129, 130, 131, 141, 142, 143, 385/144, 146; 264/1.24
See application file for complete search history.

(56) References Cited

U.S. PATENT DOCUMENTS

| | | | |
|---|---|---|---|
| 2,403,731 A | 7/1946 | MacNeille | 350/394 |
| 2,604,817 A | 7/1952 | Schupp, Jr. | 350/406 |
| 2,687,673 A | 8/1954 | Boone | 118/33 |
| 4,019,844 A | 4/1977 | Ogasawara et al. | 425/131.5 |
| 4,357,389 A | 11/1982 | Satoh et al. | 428/373 |
| 4,477,522 A | 10/1984 | Sheehan | 428/359 |
| 4,560,411 A | 12/1985 | Melchior | 106/90 |
| 4,963,151 A | 10/1990 | Ducheyne et al. | 623/16 |

(Continued)

FOREIGN PATENT DOCUMENTS

JP    5-113606    5/1993    ............. 385/147 X (Continued)

OTHER PUBLICATIONS

T. F. Cooke, "Bicomponent Fibers," *Handbook of Fiber Science and Technology:* vol. 3, *High Technology Fibers Part D,* ; Marcel Dekker, ISBN 0-8247-9470-2, 1996, pp. 247-280.

(Continued)

*Primary Examiner*—Brian M. Healy
(74) *Attorney, Agent, or Firm*—Jay R. Pralle

(57) ABSTRACT

A polarizer is formed with an arrangement of polymer fibers substantially parallel within a polymer matrix. The polymer fibers are formed of at least first and second polymer materials. At least one of the polymer matrix and the first and second polymer materials is birefringent, and provides a birefringent interface with the adjacent material. Light is reflected and/or scattered at the birefringent interfaces with sensitivity to the polarization of the light. In some embodiments, the polymer fibers are formed as composite fibers, having a plurality of scattering polymer fibers disposed within a filler to form the composite fiber. In other embodiments, the polymer fiber is a multilayered polymer fiber. The polymer fibers may be arranged within the polymer matrix as part of a fiber weave.

38 Claims, 17 Drawing Sheets

U.S. PATENT DOCUMENTS

| | | | |
|---|---|---|---|
| 5,047,288 A | 9/1991 | Hoshiro et al. | 428/290 |
| 5,059,482 A | 10/1991 | Kawamoto et al. | 428/373 |
| 5,217,794 A | 6/1993 | Schrenk | 428/220 |
| 5,251,065 A | 10/1993 | Uetsuki | 359/454 |
| 5,269,995 A | 12/1993 | Ramanathan et al. | 264/171 |
| 5,316,703 A | 5/1994 | Schrenk | 264/1.34 |
| 5,389,324 A | 2/1995 | Lewis et al. | 264/171 |
| 5,444,570 A | 8/1995 | Uetsuki | 359/483 |
| 5,612,820 A | 3/1997 | Schrenk et al. | 359/498 |
| 5,629,055 A * | 5/1997 | Revol et al. | 428/1.31 |
| 5,751,388 A | 5/1998 | Larson | 349/96 |
| 5,753,277 A | 5/1998 | Kikutani et al. | 425/461 |
| 5,783,120 A | 7/1998 | Ouderkirk et al. | 264/1.34 |
| 5,807,458 A | 9/1998 | Sanders et al. | 156/276 |
| 5,825,543 A | 10/1998 | Ouderkirk et al. | 252/585 X |
| 5,877,829 A * | 3/1999 | Okamoto et al. | 349/74 |
| 5,882,774 A | 3/1999 | Jonza et al. | 428/212 |
| 5,999,239 A | 12/1999 | Larson | 349/96 |
| 6,075,915 A | 6/2000 | Koops | 385/125 |
| 6,111,696 A | 8/2000 | Allen et al. | 359/495 |
| 6,139,626 A | 10/2000 | Norris et al. | 117/68 |
| 6,141,149 A | 10/2000 | Carlson et al. | 359/500 |
| 6,239,907 B1 | 5/2001 | Allen et al. | 359/443 |
| 6,243,521 B1 | 6/2001 | Owaki et al. | 385/123 |
| 6,301,421 B1 | 10/2001 | Wickham et al. | 385/126 |
| 6,310,671 B1 | 10/2001 | Larson | 349/96 |
| 6,326,094 B1 | 12/2001 | Asano et al. | 428/913 |
| 6,335,094 B1 | 1/2002 | Owaki et al. | 428/374 |
| 6,387,488 B1 | 5/2002 | Kumazawa et al. | 428/359 |
| 6,430,348 B1 | 8/2002 | Asano et al. | 385/131 |
| 6,433,919 B1 | 8/2002 | Chowdhury et al. | 359/332 |
| 6,498,869 B1 | 12/2002 | Yao | 385/11 |
| 6,529,676 B2 * | 3/2003 | Eggleton et al. | 385/142 |
| 6,542,681 B2 | 4/2003 | Broeng et al. | 385/123 |
| 6,542,682 B2 | 4/2003 | Cotteverte et al. | 385/125 |
| 6,577,446 B2 | 6/2003 | Kumazawa et al. | 359/577 |
| 6,674,949 B2 | 1/2004 | Allan et al. | 385/129 |
| 6,813,399 B2 | 11/2004 | Hamada | 385/11 |
| 6,876,796 B2 | 4/2005 | Garito et al. | 385/50 |
| 7,082,147 B2 | 7/2006 | Spoonhower et al. | 372/50.1 |
| 2001/0012149 A1 | 8/2001 | Lin et al. | 359/344 |
| 2002/0130988 A1 | 9/2002 | Crawford et al. | 349/86 |
| 2002/0135880 A1 | 9/2002 | Fink et al. | 359/586 |
| 2002/0154403 A1 | 10/2002 | Trotter, Jr. | 359/484 |
| 2002/0155592 A1 | 10/2002 | Kelleher et al. | 435/288.7 |
| 2002/0181911 A1 | 12/2002 | Wadsworth et al. | 385/125 |
| 2003/0031438 A1 | 2/2003 | Kambe et al. | 385/122 |
| 2003/0031846 A1 | 2/2003 | Kumazawa et al. | 428/212 |
| 2003/0035972 A1 | 2/2003 | Hanson et al. | 428/480 |
| 2003/0218704 A1 | 11/2003 | Lee et al. | 349/106 |
| 2004/0012118 A1 | 1/2004 | Perez et al. | 264/257 |
| 2004/0012855 A1 | 1/2004 | Allen et al. | 359/490 |
| 2004/0031435 A1 | 2/2004 | Park | 117/2 |
| 2004/0052484 A1 | 3/2004 | Broeng et al. | 385/125 |
| 2004/0096172 A1 | 5/2004 | Bongrand et al. | 385/123 |
| 2004/0126592 A1 | 7/2004 | Shibahara et al. | 428/441 |
| 2004/0132867 A1 | 7/2004 | Shibahara et al. | 523/466 |
| 2004/0175084 A1 | 9/2004 | Broeng et al. | 385/125 |
| 2004/0179803 A1 | 9/2004 | Bourelle | 385/129 |
| 2004/0223715 A1 | 11/2004 | Benoit et al. | 385/123 |
| 2005/0147366 A1 | 7/2005 | Large et al. | 385/123 |
| 2005/0201655 A1 | 9/2005 | Ellwood, Jr. | 385/11 |
| 2005/0201715 A1 | 9/2005 | Ellwood, Jr. | 385/147 |
| 2006/0029343 A1 | 2/2006 | Farroni et al. | 385/123 |
| 2006/0139948 A1 | 6/2006 | Huck et al. | 362/607 |
| 2006/0193577 A1 * | 8/2006 | Ouderkirk et al. | 385/115 |
| 2006/0193578 A1 * | 8/2006 | Ouderkirk et al. | 385/115 |
| 2006/0193582 A1 * | 8/2006 | Ouderkirk et al. | 385/126 |
| 2006/0193589 A1 | 8/2006 | Ouderkirk et al. | 385/135 |
| 2006/0193593 A1 | 8/2006 | Ouderkirk et al. | 385/147 |
| 2006/0194046 A1 | 8/2006 | Ouderkirk et al. | 428/364 |
| 2006/0194487 A1 | 8/2006 | Ouderkirk et al. | 442/59 |
| 2007/0042168 A1 | 2/2007 | Harada et al. | 428/292.1 |

FOREIGN PATENT DOCUMENTS

| | | | |
|---|---|---|---|
| JP | 09311205 | 2/1997 | 385/11 X |
| JP | 2000-52399 | 2/2000 | 385/129 X |
| JP | 2000239541 | 9/2000 | 385/129 X |
| JP | 2001031774 | 2/2001 | 385/11 X |
| JP | 2005-133028 | 5/2005 | 385/141 X |
| WO | WO 97/32224 | 9/1997 | 385/11 X |
| WO | WO 99/64904 | 12/1999 | 385/123 X |
| WO | WO 02/48757 | 6/2002 | 385/11 X |
| WO | WO 03/062909 | 7/2003 | 385/11 X |
| WO | WO 2004/046777 | 6/2004 | 385/123 X |

OTHER PUBLICATIONS

A. Paul, *Chemistry of Glasses*, $2^{nd}$ Edition, Chapman and Hall, 1990, pp. 41-49.

W.D. Kingery, et al., Massachusetts Institute of Technology, *Introduction to Ceramics*, $2^{nd}$ Edition, John Wiley and Sons, 1976, pp. 368-374.

Dugan et al., "Synthetic Split Microfiber Technology for Filtration" Fiber Innovation Technologies and Edward C. Homonoff & Associates, LLC, Filtration 2000 Conference, Philadelphia, PA, Nov. 2000, 9 pgs.

"King and Company—Glossary of Fabric and Textile Jargon" <http://www.kingandco.com/glossary/>, printed from internet on Oct. 1, 2003, 6 pgs.

The Texemart Times, Texemart News—Features Section, "Recent Advancements in Man-made Textiles: Microfibres", <http://www.texemart.com/news/narchive/archivedec5.asp>, Printed from the internet on Oct. 1, 2003, p. 3.

Hagewood et al., Hills Inc., Barrier Fabrics of Spunbond Specialty Fibers for Medica . . . , "Production of Sub-micron Fibers in Non-Woven Fabric", <http://www.hillsinc.net/submicron%20.shtml>, printed from the internet on Oct. 1, 2003, p. 7.

Jonza et al., "Multilayer Polymeric Color-shifting Polarizer Films", Optical Security and Counterfeit Deterrence Techniques V. Proceedings of SPIE-IS&T Electronic Imaging, SPIE vol. 5310, 2004.

Li et al., "In-Situ Microgibrillar PET/iPP Blend via Slit Die Extrusion, Hot Stretching, and Quenching: Influence of Hot Stretch Ratio on Morphology, Crystallization, and Crystal Structure of iPP at a Fixed PET Concentration", Journal of Polymer Science: Polymer Physics, vol. 42, pp. 4095-4106, 2004.

Weber et al., "Giant Birefringent Optics in Multilayer Polymer Mirrors", SCIENCE, vol. 287, Mar. 31, 2000.

* cited by examiner

REFLECTIVE POLARIZERS CONTAINING POLYMER FIBERS

RELATED APPLICATIONS

This application is related to co-owned U.S. patent application Ser. No. 11/068,158, titled "COMPOSITE POLYMER FIBERS", pending, filed on even date herewith; Ser. No. 11/068,159, pending, titled "COMPOSITE POLYMERIC OPTICAL FILMS WITH CO-CONTINUOUS PHASES", filed on even date herewith; Ser. No. 11/068,590, pending, titled "OPTICAL ELEMENTS CONTAINING A POLYMER FIBER WEAVE", filed on even date herewith; Ser. No. 11/067,848, pending titled "POLYMER PHOTONIC CRYSTAL FIBERS", filed on even date herewith; and Ser. No. 11/068,313, pending, titled "POLYMERIC PHOTONIC CRYSTALS WITH CO-CONTINUOUS PHASES", filed on even date herewith all of which are incorporated herein by reference.

FIELD OF THE INVENTION

The invention relates to polymer optical film and more particularly to reflective polarizing polymer optical film that contains polymer fibers.

BACKGROUND

Unpolarized light waves vibrate in a large number of planes about the axis of a light beam. If the waves vibrate in one plane only, the light is said to be plane polarized. Several useful optical systems can be implemented using polarized light. For example, electro-optical devices such as liquid crystal display screens are illuminated with polarized light and use crossed polarizers in conjunction with an addressable liquid crystal interlayer to provide the basis for displaying image formation. In the field of photography, polarizing filters have been used to reduce the glare and the brightness of specular reflection. Polarizing filters, circular polarizers or other optical components have also been used for glare reduction in display device screens.

Several different kinds of polarizing film are available for polarizing unpolarized light. Absorbing (dichroic) polarizers have, as an inclusion phase, polarization-dependent absorbing species, often an iodine-containing chain, that are aligned within a polymer matrix. Such a film absorbs light polarized with its electric field vector aligned parallel to absorbing species and transmits light polarized perpendicular to the absorbing species. The optical properties of such a film are typically specular, with very little diffuse transmission through the film or diffuse reflection from the film surfaces.

Another type of polarizing film is a reflective polarizer, which separates light in different polarization states by transmitting light in one state and reflecting light in the other state. One type of reflective polarizer is a multilayer optical film (MOF), which is a film formed of a stack of many layers of alternating polymer materials. One of the materials is optically isotropic while the other is birefringent, with one of its refractive indices matched to that of the isotropic material. The layer thicknesses may be varied throughout the stack so as to be quarter wave layers over a wide range of wavelengths, for example over the visible region. Light incident in one polarization state experiences the matched refractive indices and is substantially specularly transmitted through the polarizer. Light incident in the other polarization state, however, experiences multiple coherent or incoherent reflections at the interfaces between the different layers and is reflected by the polarizer. Since the alternating polymer layers are substantially planar, the reflected light is mostly specularly reflected.

Another type of reflective polarizing film is constructed from inclusions dispersed within a continuous phase matrix. The inclusions are small relative to the width and height of the film. The characteristics of these inclusions can be manipulated to provide a range of reflective and transmissive properties to the film. The inclusions constitute a disperse polymer phase within the continuous phase matrix. The inclusion size and alignment can be altered by stretching the film. Either the continuous phase or the disperse phase is birefringent, with one of the refractive indices of the birefringent material matching to the refractive index of the other phase, which is optically isotropic. Selection of the materials for the continuous and disperse phases, along with the degree of stretching, can affect the degree of birefringent refractive index mismatch between the disperse phase and the continuous phase. Other characteristics that can be adjusted include the inclusion size with respect to wavelength within the film, the inclusion shape and the inclusion volumetric fill factor. In such systems, light polarized to experience the refractive index mismatch between the disperse and continuous phases is diffusely reflected, whereas the orthogonally polarized light is specularly transmitted.

SUMMARY OF THE INVENTION

One particular embodiment of the invention is directed to an optical body that comprises a polymer matrix and a plurality of polymer fibers disposed within the polymer matrix. At least one of the polymer fibers comprises multiple birefringent interfaces for reflecting light. The birefringent interfaces are formed between a first polymer material and a second polymer material, at least one of the first and second polymer materials being birefringent. The birefringent interfaces are internal to the polymer fiber and are elongated along an axis of the polymer fiber. The polymer fibers are oriented substantially parallel to a first axis. A refractive index difference at the birefringent interfaces for light polarized parallel to the first axis is different from a refractive index difference at the birefringent interfaces for light polarized parallel to a second axis, the second axis being orthogonal to the first axis.

Another embodiment of the invention is directed to an optical body that comprises an optical material having a first refractive index, $n_x$, along a first axis and a second refractive index, $n_y$, along a second axis perpendicular to the first axis. Elongated polymer fibers are disposed within the optical material parallel to the first axis. The polymer fibers comprise a first birefringent material elongated along the first axis and having a refractive index, $n_{1x}$, along the first axis and a refractive index $n_{1y}$ along the second axis, where $n_{1x}$ is different from $n_{1y}$. The elongated polymer fibers comprise a second material elongated along the first axis and having a refractive index $n_{2x}$ along the first axis and a refractive index $n_{2y}$ along the second axis. The optical body scatters incident light polarized along the first axis differently than incident light polarized along the second axis.

Another embodiment of the invention is directed to an optical body that comprises a polymer matrix and a plurality of polymer fibers disposed within the polymer matrix. At least one of the polymer fibers comprises multiple, elongated birefringent scattering means for scattering incident light, the scattering means being provided internally within the polymer fibers.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
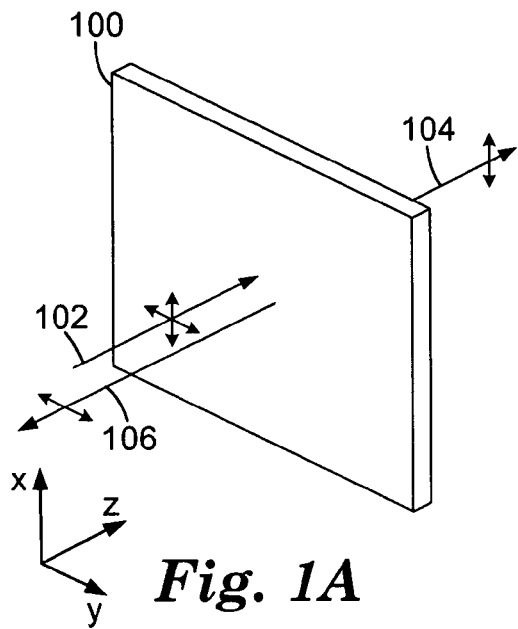
FIGS. 1A and 1B schematically illustrate polarizers that demonstrate specular reflection and diffuse reflection respectively.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is more particularly applicable to polarized optical systems.

As used herein, the terms "specular reflection" and "specular reflectance" refer to the reflectance of light rays from a body where the angle of reflection is substantially equal to the angle of incidence, where the angles are measured relative to a normal to the body's surface. In other words, when the light is incident on the body with a particular angular distribution, the reflected light has substantially the same angular distribution. The terms "diffuse reflection" or "diffuse reflectance" refer to the reflection of rays where the angle of some of the reflected light is not equal to the angle of incidence. Consequently, when light is incident on the body with a particular angular distribution, the angular distribution of the reflected light is different from that of the incident light. The terms "total reflectance" or "total reflection" refer to the combined reflectance of all light, specular and diffuse.

Similarly, the terms "specular transmission" and "specular transmittance" are used herein in reference to the transmission of light through a body where the angular distribution of the transmitted light is substantially the same as that of the incident light. The terms "diffuse transmission" and "diffuse transmittance" are used to describe the transmission of light through a body, where the transmitted light has an angular distribution that is different from the angular distribution of the incident light. The terms "total transmission" or "total transmittance" refer to the combined transmission of all light, specular and diffuse.

Figure 1B:
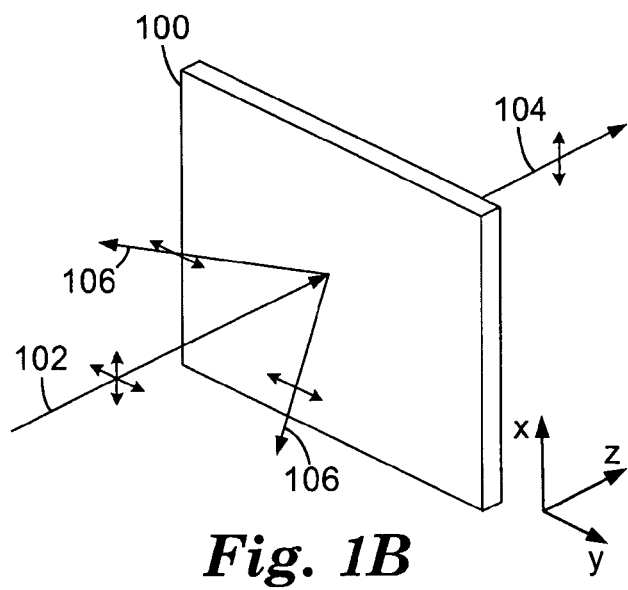

A reflective polarizer 100 in the form of a film is schematically illustrated in FIGS. 1A and 1B. In the convention adopted herein, the thickness direction of the film is taken as the z-axis, and x-y plane is parallel to the plane of the film. When unpolarized light 102 is incident on the polarizer 100, the light 104 polarized parallel to the transmission axis of the polarizer 100 is transmitted, while the light 106 polarized parallel to the reflection axis of the polarizer 100 is reflected. The angular distribution of the reflected light is dependent on various characteristics of the polarizer 100. For example, in some exemplary embodiments the light 106 may be specularly reflected, as is schematically illustrated in FIG. 1A, while in other embodiments the light 106 may be diffusely reflected, as is schematically illustrated in FIG. 1B. In other embodiments, the reflected light may include both specular and diffuse components. In the illustrated embodiment, the transmission axis of the polarizer is parallel to the x-axis and the reflection axis of the polarizer 100 is parallel to the y-axis. In other embodiments, these may be reversed.

The transmitted light 104 may be specularly transmitted, diffusely transmitted, or may be transmitted with a combination of specular and diffuse components.

Figure 2:
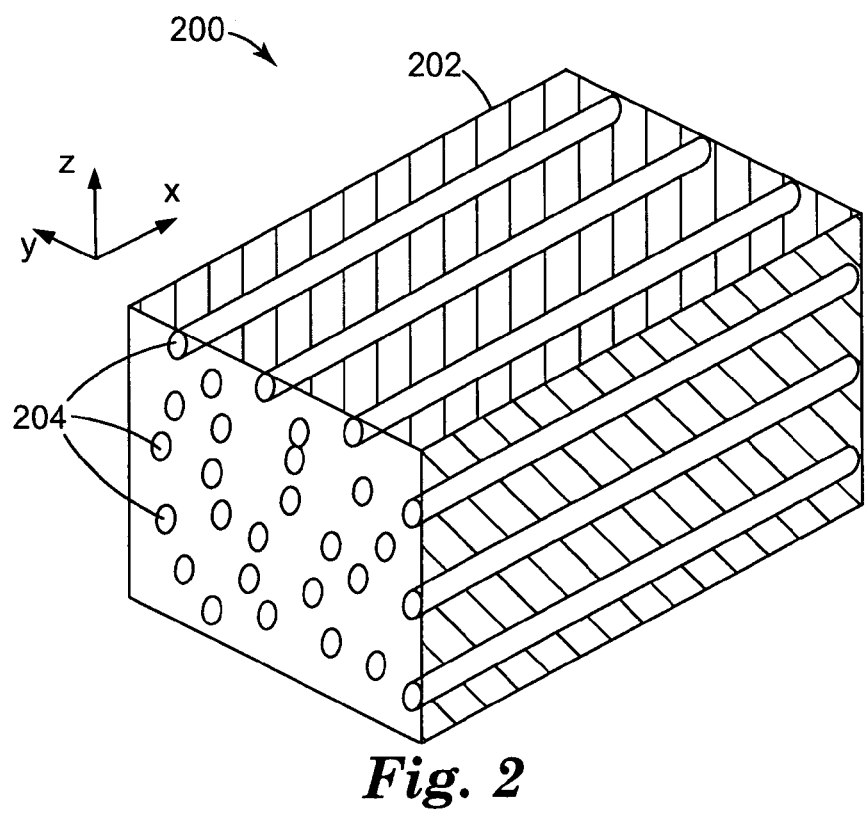
FIG. 2 schematically illustrates a cut-away view of an embodiment of a polarizer according to principles of the present invention.

A cut-away view through a reflective polarizer body according to an exemplary embodiment of the present invention is schematically presented in FIG. 2. The optical body 200 comprises a polymer matrix 202, also referred to as a continuous phase. The polymer matrix may be optically isotropic or optically birefringent. For example, the polymer matrix may be uniaxially or biaxially birefringent, meaning that the refractive index of the polymer may be different along one direction and similar in two orthogonal directions (uniaxial) or different in all three orthogonal directions (biaxial).

Polymer fibers 204 are disposed within the matrix 202. The polymer fibers 204 comprise at least two materials. In some exemplary embodiments, one of the materials is birefringent while the other material, or materials, is/are isotropic. In other embodiments, two or more of the materials forming the fiber are birefringent. Also, in some other embodiments, the materials forming the fiber may be isotropic. In other embodiments, both isotropic and birefringent polymer fibers 204 may be disposed within the matrix 202.

The polymer fibers 204 may be organized within the matrix 202 as single fibers, as illustrated, or in many other arrangements. Some exemplary arrangements include yarns, a tow (of fibers or yarns) arranged in one direction within the polymer matrix, a weave, a non-woven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

The refractive indices in the x-, y-, and z-directions for the first fiber material may be referred to as $n_{1x}$, $n_{1y}$ and $n_{1z}$, and the refractive indices in the x-, y-, and z-directions for the second fiber material may be referred to as $n_{2x}$, $n_{2y}$ and $n_{2z}$. Where the material is isotropic, the x-, y-, and z-refractive indices are all substantially matched. Where the first fiber material is birefringent, at least one of the x-, y- and z-refractive indices is different from the others.

There are multiple interfaces within each fiber 204 between the first fiber material and the second fiber material. Where at least one of the materials forming the interface is birefringent, the interface is referred to as a birefringent interface. For example, if the two materials present their x-and y-refractive indices at the interface, and $n_{1x} \neq n_{1y}$, i.e., the first material is birefringent, then the interface is birefringent. Different exemplary embodiments of the polymer fibers containing birefringent interfaces are discussed below.

The fibers 204 are disposed generally parallel to an axis, illustrated as the x-axis in the figure. The refractive index difference at the birefringent interfaces within the fibers 204 for light polarized parallel to the x-axis, $n_{1x}$-$n_{2x}$, may be different from the refractive index difference for light polarized parallel to the y-axis, $n_{1y}$-$n_{2y}$. Thus, for one polarization state, the refractive index difference at the birefringent interfaces in the fibers 204 may be relatively small. In some exemplary cases, the refractive index difference may be less than 0.05. This condition is considered to be substantially index-matched. This refractive index difference may be less than 0.03, less than 0.02, or less than 0.01. If this polarization direction is parallel to the x-axis, then x-polarized light passes through the body 200 with little or no reflection. In other words, x-polarized light is highly transmitted through the body 200.

The refractive index difference at the birefringent interfaces in the fibers may be relatively high for light in the orthogonal polarization state. In some exemplary examples, the refractive index difference may be at least 0.05, and may be greater, for example 0.1, or 0.15 or may be 0.2. If this polarization direction is parallel to the y-axis, then y-polarized light is reflected at the birefringent interfaces. Thus, y-polarized light is reflected by the body 200. If the birefringent interfaces within the fibers 204 are substantially parallel to each other, then the reflection may be essentially specular. If, on the other hand, the birefringent interfaces within the fibers 204 are not substantially parallel to each other, then the reflection may be substantially diffuse. Some of the birefringent interfaces may be parallel, and other interfaces may be non-parallel, which may lead to the reflected light containing both specular and diffuse components. Also, a birefringent interface may be curved, or relatively small, in other words within an order of magnitude of the wavelength of the incident light, which may lead to diffuse scattering.

While the exemplary embodiment just described is directed to index matching in the x-direction, with a relatively large index difference in the y-direction, other exemplary embodiments include index matching in the y-direction, with a relatively large index difference in the x-direction.

The polymer matrix 202 may be substantially optically isotropic, for example having a birefringence, $n_{3x}$-$n_{3y}$, of less than about 0.05, and preferably less than 0.01, where the refractive indices in the matrix for the x- and y-directions are $n_{3x}$ and $n_{3y}$, respectively. In other embodiments, the polymer matrix 202 may be birefringent. Consequently, in some embodiments, the refractive index difference between the polymer matrix and the fiber materials may be different in different directions. For example, the x-refractive index difference, $n_{1x}$-$n_{3x}$, may be different from the y-refractive index difference, $n_{1y}$-$n_{3y}$. In some embodiments, one of these refractive index differences may be at least twice as large as the other refractive index difference.

In some embodiments, the refractive index difference, the extent and shape of the birefringent interfaces, and the relative positions of the birefringent interfaces may result in diffuse scattering of one of the incident polarizations more than the other polarization. Such scattering may be primarily back-scattering (diffuse reflection) forward-scattering (diffuse transmission) or a combination of both back- and forward-scattering.

Suitable materials for use in the polymer matrix and/or in the fibers include thermoplastic and thermosetting polymers that are transparent over the desired range of light wavelengths. In some embodiments, it may be particularly useful that the polymers be non-soluble in water. Further, suitable polymer materials may be amorphous or semi-crystalline, and may include homopolymer, copolymer or blends thereof. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly(methylmethacrylate) (PMMA) and PMMA copolymers; ethoxylated and propoxylated (meth)acrylates; multi-functional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly (dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly(alkane napthalates), such as poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds. With the exception of syndiotactic PS, these polymers may be used in an optically isotropic form.

Several of these polymers may become birefringent when oriented. In particular, PET, PEN, and copolymers thereof, and liquid crystal polymers, manifest relatively large values of birefringence when oriented. Polymers may be oriented using different methods, including extrusion and stretching. Stretching is a particularly useful method for orienting a polymer, because it permits a high degree of orientation and may be controlled by a number of easily controllable external parameters, such as temperature and stretch ratio. The refractive indices for a number of exemplary polymers, oriented and unoriented, are provided in Table I below.

TABLE I

Typical Refractive Index Values for Some Polymer Materials

| Resin/Blend | S.R. | T (° C.) | $n_x$ | $n_y$ | $n_z$ |
| --- | --- | --- | --- | --- | --- |
| PEN | 1 | — | 1.64 | | |
| PEN | 6 | 150 | 1.88 | 1.57 | 1.57 |
| PET | 1 | — | 1.57 | | |
| PET | 6 | 100 | 1.69 | 1.54 | 1.54 |
| CoPEN | 1 | — | 1.57 | | |
| CoPEN | 6 | 135 | 1.82 | 1.56 | 1.56 |
| PMMA | 1 | — | 1.49 | | |
| PC, CoPET blend | 1 | — | 1.56 | | |
| THV | 1 | — | 1.34 | | |
| PETG | 1 | — | 1.56 | | |
| SAN | 1 | — | 1.56 | | |
| PCTG | 1 | — | 1.55 | | |
| PS, PMMA copolymer | 1 | — | 1.55-1.58 | | |
| PP | 1 | — | 1.52 | | |
| Syndiotactic PS | 6 | 130 | 1.57 | 1.61 | 1.61 |

PCTG and PETG (a glycol-modified polyethylene terephthalate) are types of copolyesters available from, for example, Eastman Chemical Co., Kingsport, Tenn., under the Eastar™ brand name. THV is a polymer of tetrafluoroethylene, hexafluoropropylene and vinylidene fluoride, available from 3M Company, St. Paul, Minn., under the brand name Dyneon™. The PS/PMMA copolymer is an example of a copolymer whose refractive index may be "tuned" by changing the ratio of the constituent monomers in the copolymer to achieve a desired value of refractive index. The column labeled "S.R." contains the stretch ratio. A stretch ratio of 1 means that the material is unstretched and unoriented. A stretch ratio of 6 means that sample was stretched to six times it original length. If stretched under the correct temperature conditions, the polymeric molecules are oriented and the material becomes birefringent. It is possible, however, to stretch the material without orienting the molecules. The column labeled "T" indicates the temperature at which the sample was stretched. The stretched samples were stretched as sheets. The columns labeled $n_x$, $n_y$ and $n_z$ refer to the refractive indices of the material. Where no value is listed in the table for $n_y$ and $n_z$, the values of $n_y$ and $n_z$ are the same as for $n_x$.

The behavior of the refractive index under stretching a fiber is expected to give results similar to, but not necessarily the same as, those for stretching a sheet. Polymer fibers may be stretched to any desired value that produces desired values of refractive index. For example, some polymer fibers may be stretched to produce a stretch ratio of at least 3, and maybe at least 6. In some embodiments, polymer fibers may be stretched even more, for example to a stretch ratio of up to 20, or even more.

A suitable temperature for stretching to achieve birefringence is approximately 80% of the polymer melting point, expressed in Kelvins. Birefringence may also be induced by stresses induced by flow of the polymer melt experienced during extrusion and film formation processes. Birefringence may also be developed by alignment with adjacent surfaces such as fibers in the film article. Birefringence may either be positive or negative. Positive birefringence is defined as when the direction of the electric field axis for linearly polarized light experiences the highest refractive index when it is parallel to the polymer's orientation or aligning surface. Negative birefringence is defined as when the direction of the electric field axis for linearly polarized light experiences the lowest refractive index when it is parallel to the polymer's orientation or aligning surface. Examples of positively birefringent polymers include PEN and PET. An example of a negatively birefringent polymer includes syndiotactic polystyrene.

The matrix 202 and/or the polymer fibers 204 may be provided with various additives to provide desired properties to the optical body 200. For example, the additives may include one or more of the following: an anti-weathering agent, UV absorbers, a hindered amine light stabilizer, an antioxidant, a dispersant, a lubricant, an anti-static agent, a pigment or dye, a nucleating agent, a flame retardant and a blowing agent. Other additives may be provided for altering the refractive index of the polymer or increasing the strength of the material. Such additives may include, for example, organic additives such as polymeric beads or particles and polymeric nanoparticles, or inorganic additives, such as glass, ceramic or metal-oxide nanoparticles, or milled, powered, bead, flake or particulate glass, ceramic or glass-ceramic. The surface of these additives may be provided with a binding agent for binding to the polymer. For example, a silane coupling agent may be used with a glass additive to bind the glass additive to the polymer.

In some embodiments, it may be preferable that the matrix 202 or a component of the polymer fibers 204 be non-soluble, or at least resistant to solvents. Examples of suitable materials that are solvent resistant include polypropylene, PET and PEN. In other embodiments it may be preferable that the matrix 202 or component of the polymer fibers 204 is soluble in an organic solvent. For example, a matrix 202 or fiber component formed of polystyrene is soluble in an organic solvent such as acetone. In other embodiments, it may be preferable that the matrix is water soluble. For example, a matrix 202 or fiber component formed of polyvinyl acetate is soluble in water.

The refractive index of the materials in some embodiments of optical element may vary along the length of the fiber, in the x-direction. For example, the element may not be subject to uniform stretching, but may be stretched to a greater degree in some regions than in others. Consequently, the degree of orientation of the orientable materials is not uniform along the element, and so the birefringence may vary spatially along the element.

Furthermore, the incorporation of fibers within the matrix may improve the mechanical properties of the optical element. In particular, some polymeric materials, such as polyester, are stronger in the form of a fiber than in the form of a film, and so an optical element containing fibers may be stronger than one of similar dimensions that contains no fibers.

The polymer fibers 204 may be straight, but need not be straight, for example the polymer fibers 204 may be kinked, spiraled or crimped.

Figure 3A:
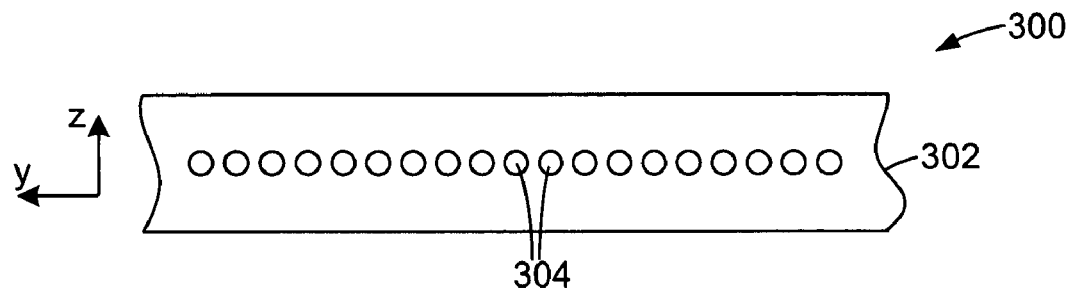
FIGS. 3A-3D schematically illustrate cross-sectional views through embodiments of optical elements according to principles of the present invention.

The polymer fibers 204 may be arranged within the matrix 202 in many different ways. For example, the fibers 204 may be positioned randomly across the cross-sectional area of the matrix 202: in FIG. 2, the position of different fibers 204 in the y-z plane is random. Other cross-sectional arrangements may be used. For example, in the exemplary embodiment schematically illustrated in FIG. 3A, which shows a cross-section through an optical element 300, the fibers 304 are arranged in a one-dimensional array within the matrix 302, with regular spacing between adjacent fibers 304. In some variations of this embodiment, the spacing between adjacent fibers 304 need not be the same for all fibers 304. The optical element 300 may be a polarizer.

Figure 3B:
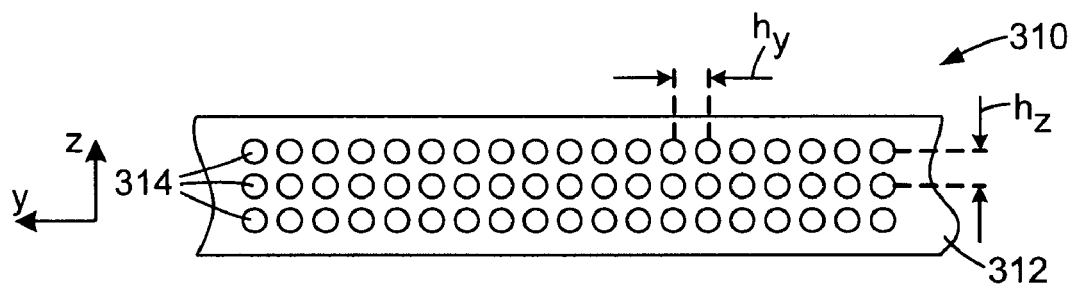
Figure 3C:
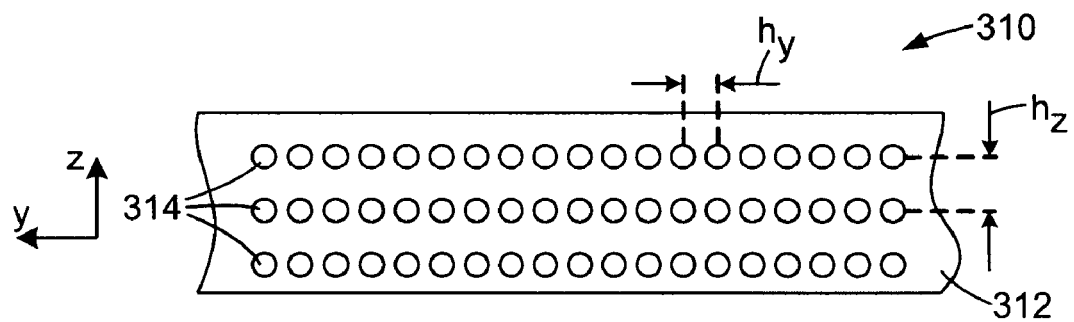

In another exemplary embodiment, schematically illustrated in FIG. 3B as a cross-section through an optical element 310, the fibers 314 are arranged in a regular two-dimensional array within the matrix 312. In the illustrated embodiment, the separation distance between adjacent fibers 314 in the y-direction, $h_y$, is the same as the separation distance between adjacent fibers in the z-direction, $h_z$. This need not be the case, and the separation distance in the z-direction, $h_z$, may be different from the separation distance in the y-direction, $h_y$, as is schematically illustrated in FIG. 3C. The optical element 310 may be a polarizer.

Figure 3D:
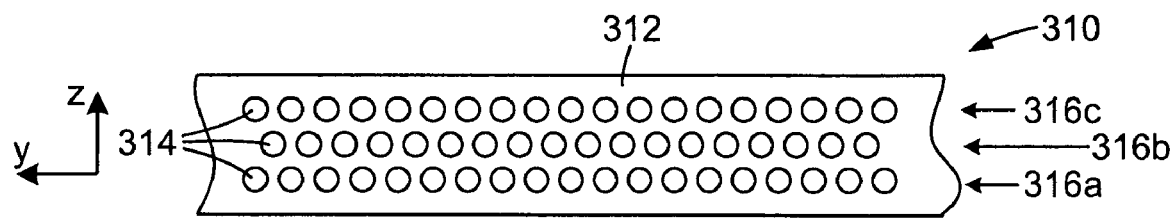

In another embodiment, the fibers 314 may be offset between adjacent rows, for example as is schematically illustrated in FIG. 3D, creating an hexagonally-packed fiber pattern. Other regular patterns of fibers 314 may be employed, or irregular patterns of fibers 314 may be employed.

Figure 3E:
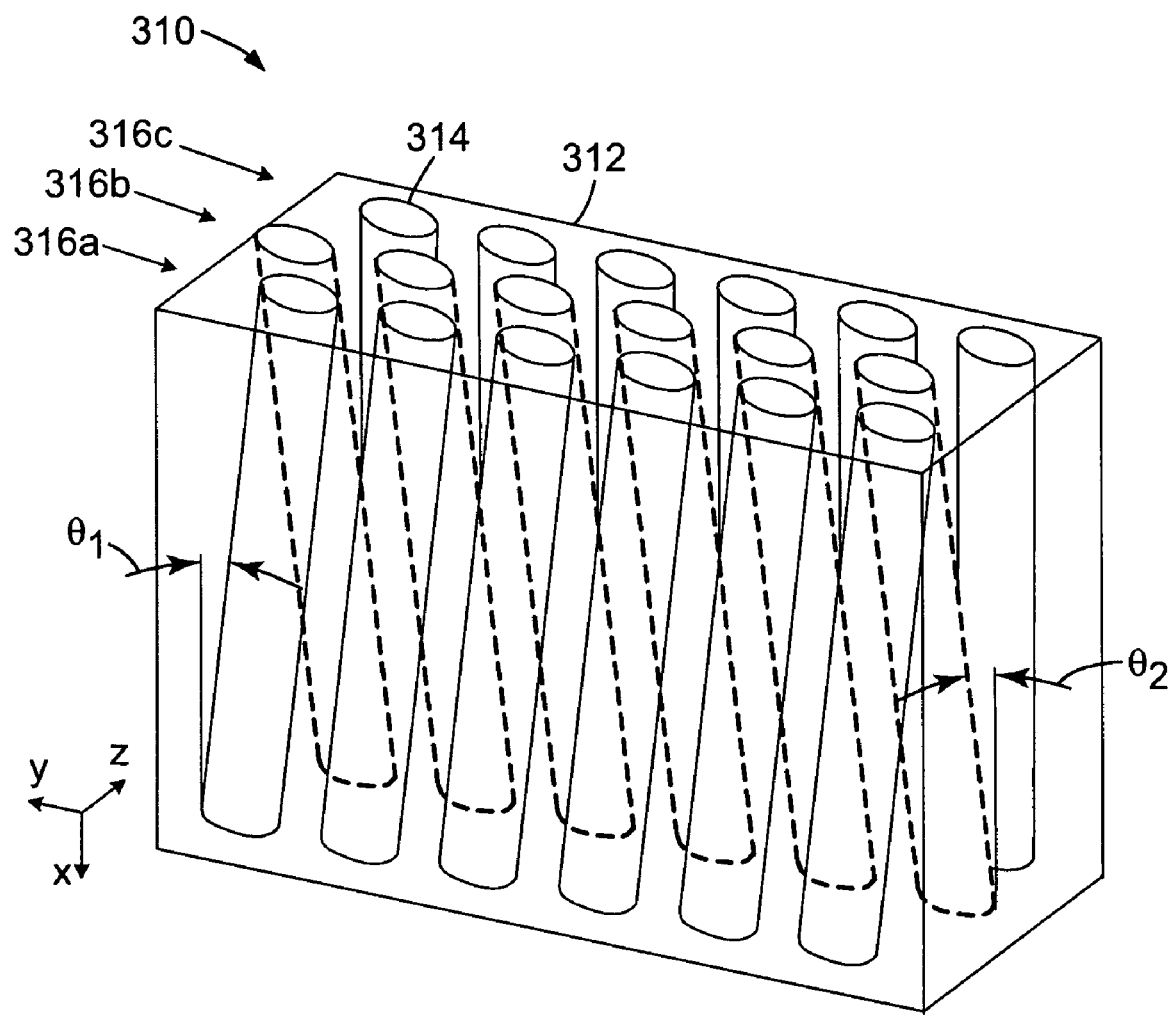
FIG. 3E schematically illustrates an embodiment of an optical element in which not all the polymer fibers are parallel, according to principles of the present invention.

While the fibers 314 may all be substantially parallel to the x-axis, this need not be the case, and some fibers 314 may lie with greater or smaller angles to the x-axis. For example, in the example optical element 310 illustrated in FIG. 3D, and further illustrated in FIG. 3E, the first row 316a of fibers 314 may be oriented so as that the fibers 314 lie parallel to each other in a plane parallel to the y-z plane, but at a first angle, θ1, relative to the x-axis. The fibers 314 in the second row 316b may also lie parallel to each other within a plane parallel to the y-z plane, but at a second angle, θ2, to the x-axis, not necessarily equal to the first angle. Also, the fibers 314 in the third row 316c may lie parallel to teach other in a plane parallel to the y-z axis, but at a third angle, θ3, relative to the x-axis. The third angle may or may not be equal to either the first or second angles. In the illustrated embodiment, the value of θ3 is equal to zero, and the fibers 314 in the third row 316c are parallel to the x-axis. The different values of θ1, θ2, and θ3 may, however, reach up to 90°.

Such an arrangement can be particularly useful where the fibers in one row are effective for light in a first wavelength band and the fibers in another row are effective for light in a second wavelength band different from the first wavelength band. Consider the illustrative example where the fibers 314 in the first row 316a are effective at reflectively polarizing light in a red bandwidth and the fibers 314 in the second row 316b are effective at reflectively polarizing light in a blue bandwidth. Therefore, if the optical element 310 were to be illuminated with a mixture of red and blue light, the first row 316a of fibers 314 would pass all the blue light while transmitting red light polarized at the angle θ1. The second row 316a of fibers 314 would transmit the red light polarized at the angle θ1 while also transmitting blue light polarized parallel to the angle θ2. If the angles θ1 and θ2 were separated by 90°, the element 310 would transmit red light in one polarization state and blue light in the orthogonal polarization state. Likewise, the reflected blue light is polarized orthogonally to the reflected red light. It will be appreciated that different numbers of rows of fibers 314 may be aligned at each angle, and be used for each color band.

Figure 3F:
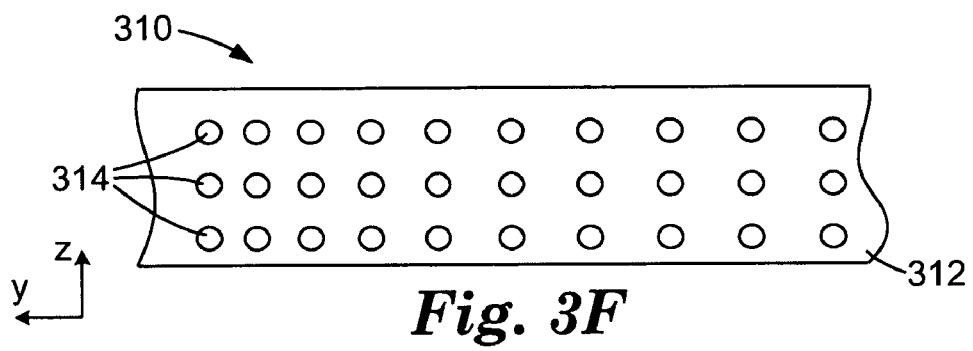
FIGS. 3F-3H schematically illustrate cross-sectional views through embodiments of optical elements according to principles of the present invention.
Figure 3G:
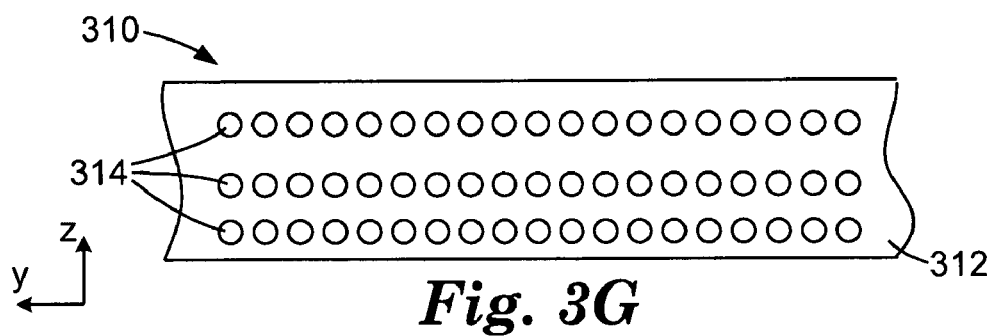

In some embodiments, the density of the fibers 314 may be constant within the optical element 300, 310, or may vary within the optical element 300, 310. For example, the density of fibers 314 may decrease from one side of the optical element 300, 310, or may vary in some other manner. To illustrate this further, FIG. 3F schematically illustrates an embodiment of an optical element 310 in which the density of fibers 314 varies across the element 310. In particular the spacing between adjacent fibers in the y-direction is not constant for all positions of y across the element 310. FIG. 3G schematically illustrates an optical element 310 in which the density of the fibers 314 varies through the element 310. In particular, the spacing between adjacent fibers in the z-direction is not constant for all positions of z through the element 310. Other variations are possible, for example the spacing between nearest neighbor fibers may vary in both the y-direction and in the z-direction.

Figure 3H:
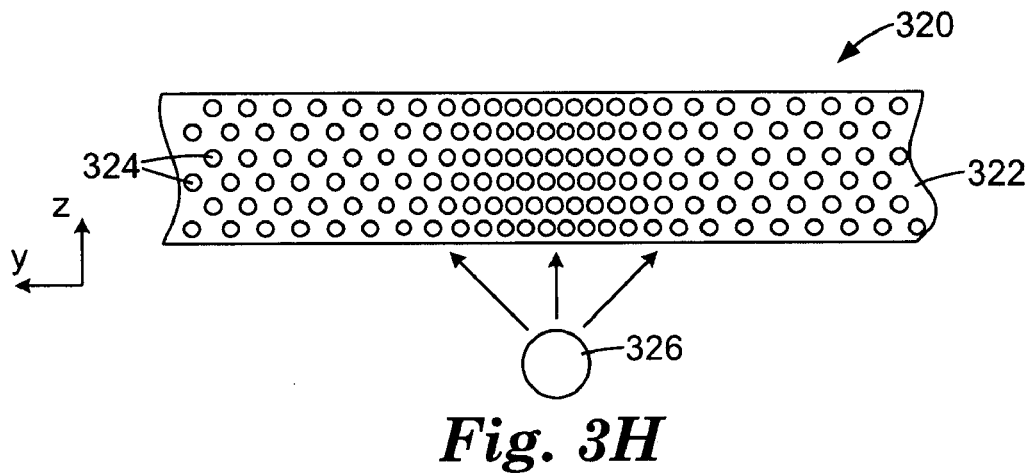

Another embodiment is schematically illustrated in FIG. 3H, in which an optical element 320 has polymer fibers 324 embedded within a matrix 322. In this particular embodiment, the center-to-center spacing between adjacent fibers 324 is reduced in one region, at the center of the figure, relative to neighboring regions on either side. Consequently, the fill factor, i.e., the fraction of the cross-sectional area of the element 320 taken up by the fibers 324, is increased in that region. Such a variation in the fill factor may be useful, for example, to improve the uniformity of light transmitted through the element 320 from a light source 326. This may be important, for example, where the element 320 is included in a direct view screen lit by discrete light sources: in such devices it is important to present the viewer with an image of uniform illumination. When a light source is placed behind a uniform diffuser, the brightness of the light transmitted through the diffuser is highest above the light source. The variation in fill factor illustrated in FIG. 3H may be used to increase the amount of diffusion directly above the light source 326, thus reducing the non-uniformity in the intensity of the transmitted light.

Figure 3I:
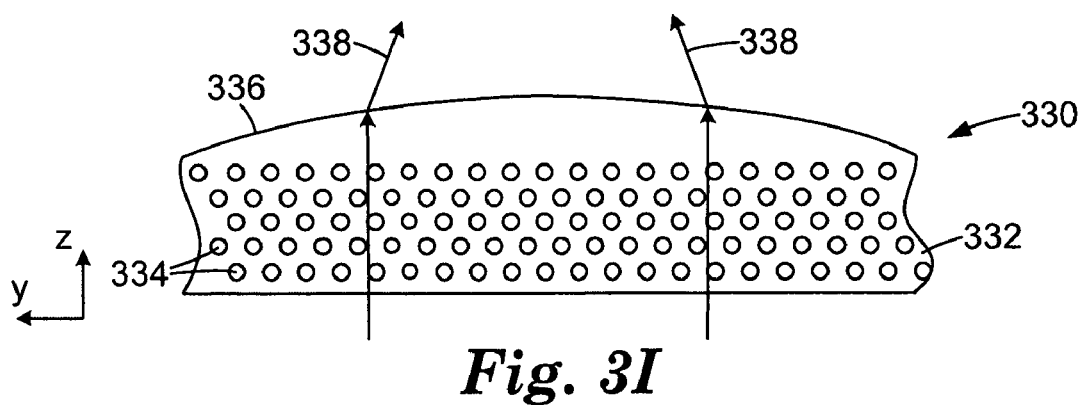
FIGS. 3I-3M schematically illustrate cross-sectional views through embodiments of optical elements having structured surfaces according to principles of the present invention.

The optical element of the present disclosure may have flat surfaces, for example the flat surfaces parallel to the x-y plane as shown in FIGS. 1A and 1B. The element may also include one or more surfaces that are structured to provide desired optical effects for light transmitted through, or reflected by, the polarizer. For example, in one exemplary embodiment schematically illustrated in FIG. 3I, the optical element 330, which may be a polarizer, is formed with a matrix 332 containing a number of polymer fibers 334, and may have one or more curved surfaces 336. The curved surfaces 336 provide optical power, focusing or defocusing, to light transmitted through the surface 336. In the illustrated embodiment, rays 338 represent examples of light rays, polarized parallel to the transmission axis of the optical element 330, that are focused by the curved refracting surface 336. In other exemplary embodiments, the input surface of the element 330, through which light enters the element 330, may be curved, or there may be other surface structure. Furthermore, there may be surface structure on the output surface, through which transmitted light exits the optical element 330. An example of surface structure includes constructions such as a Fresnel lens structure. Such a structure is also considered to provide optical power to light passing through the structured surface.

The structured surface of either or both the input and output surfaces, may also include rectilinear regions in addition to, or instead of, curved regions. For example, in another exemplary embodiment, schematically illustrated in FIG. 3J, the optical element 340, formed with a matrix 342 containing polymer fibers 344, may be provided with a prismatically structured surface 346, referred to as a brightness enhancing surface. A brightness enhancing surface is commonly used, for example in backlit liquid crystal displays, to reduce the cone angle of the light illuminating the display panel, and thus increase the on-axis brightness for the viewer. The figure shows an example of two light rays 348 and 349 that are non-perpendicularly incident on the element 340. Light ray 348 is in the polarization state that is transmitted by the element 340, and is also diverted towards the z-axis by the structured surface 346. Light ray 349 is in the polarization state that is diffusely reflected by the element 340. The brightness enhancing surface may be arranged so that the prism structures are parallel to the fibers 344, which is also parallel to the x-axis, as illustrated. In other embodiments, the prism structures may lie at some other angle relative to the direction of the fibers. For example, the ribs may lie parallel to the y-axis, perpendicular to the fibers, or at some angle between the x-axis and the y-axis.

Structured surfaces may be formed on the matrix using any suitable method. For example, the matrix may be cured while its surface is in contact with the surface of a tool, such as a microreplication tool, whose tool surface produces the desired shape on the surface of the polymer matrix.

Figure 3J:
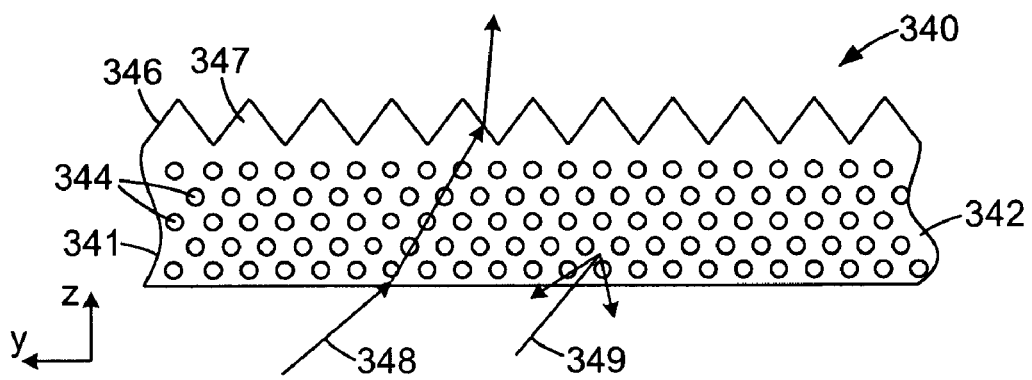
Figure 3K:
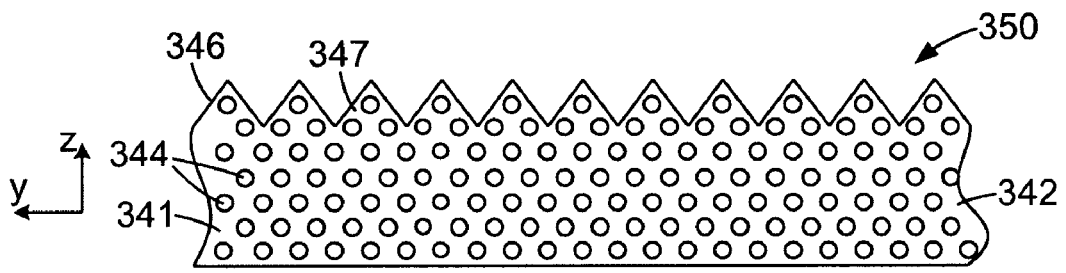
Figure 3L:
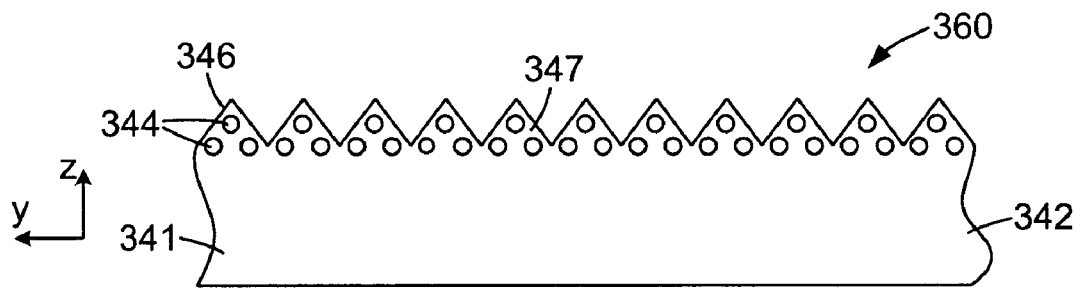

The polymer fibers may be present across different regions of the optical element. In FIG. 3J, the polymer fibers 344 are not located in the structure 347 formed by the structured surface 346, but are located only in the main body 341 of the element 340. In other embodiments, the polymer fibers 344 may be distributed differently. For example, in the optical element 350, schematically illustrated in FIG. 3K, the polymer fibers 344 are located within both the main body 341 of the element 350, and also in the structure 347 formed by the structured surface 346. In another example, schematically illustrated in FIG. 3L, the polymer fibers 344 are located only in the structure 347 of the element 360 and not in the main body 341 of the element 360.

Figure 3M:
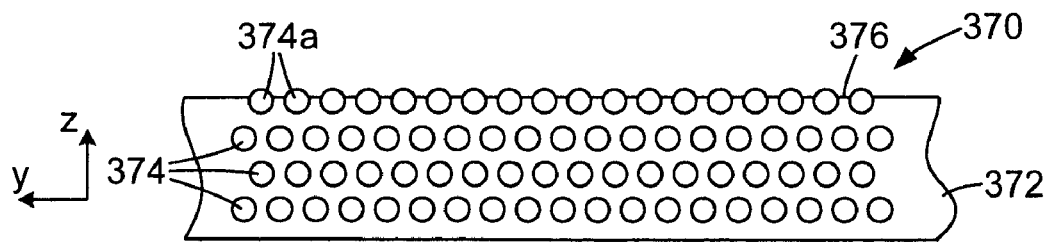

Another exemplary embodiment of the invention is schematically illustrated in FIG. 3M, in which the element 370 has polymer fibers 374 in a matrix 372. In this particular embodiment, some of the fibers 374a are not completely embedded within the matrix 372, but penetrate the surface 376 of the matrix 372.

In some exemplary embodiments, the polymer fibers disposed within the polarizers contain volumes of different polymer materials, including at least a birefringent material and another material, for example a substantially non-birefringent material. These different materials may be arranged in many different ways, for example in regular alternating layers, or as fine fibers of one material disposed within a "pool" of the other material. Several different exemplary embodiments of polymer fibers containing multiple internal birefringent interfaces are discussed below.

The matrix material may have less birefringence than the birefringent material of the fiber, may have no birefringence, or may be oppositely birefringent. For example, if the birefringent material in the fiber has $n_x > n_y$, then the matrix material may have $n_y > n_x$.

In a preferred exemplary embodiment, the birefringent material is of a type that undergoes a change in refractive index upon orientation. Consequently, as the fiber is oriented, refractive index matches or mismatches are produced along the direction of orientation. By careful manipulation of orientation parameters and other processing conditions, the positive or negative birefringence of the birefringent material can be used to induce diffuse reflection or transmission of one or both polarizations of light along a given axis. The relative ratio between transmission and diffuse reflection is dependent on a number of factors such as, but not limited to, the concentration of the birefringent interfaces in the fiber, the dimension of the fiber, the square of the difference in the index of refraction at the birefringent interfaces, the size and geometry of the birefringent interfaces, and the wavelength or wavelength range of the incident radiation.

The magnitude of the index match or mismatch along a particular axis affects the degree of scattering of light polarized along that axis. In general, the scattering power varies as the square of the index mismatch. Thus, the larger the mismatch in refractive index along a particular axis, the stronger the scattering of light polarized along that axis. Conversely, when the mismatch along a particular axis is small, light polarized along that axis is scattered to a lesser extent and the transmission through the volume of the body becomes increasingly specular.

If the index of refraction of the non-birefringent material matches that of the birefringent material along some axis, then incident light polarized with electric fields parallel to this axis will pass through the fiber unscattered regardless of the size, shape, and density of the portions of birefringent material. In addition, if the refractive index along that axis is also substantially matched to that of the polymer matrix of the polarizer body, then the light passes through the body substantially unscattered. For purposes of this disclosure, substantial matching between two refractive indices occurs when the difference between the indices is less than at most 0.05, and preferably less than 0.03, 0.02 or 0.01.

If the indices between the birefringent material and non-birefringent material are not matched along some axis, then the fiber scatters or reflects light polarized along this axis. The strength of the scattering is determined, at least in part, by the magnitude of the index mismatch for scatterers having a given cross-sectional area with dimensions larger than approximately $\lambda/30$, where $\lambda$ is the wavelength of the incident light in the polarizer. The exact size, shape and alignment of a mismatched interface play a role in determining how much light will be scattered or reflected into various directions from that interface. If the density and thickness of the scattering layer is sufficient, according to multiple scattering theory, incident light will be either reflected or absorbed, but not transmitted, regardless of the details of the scatterer size and shape.

Prior to use in the polarizer, the fibers are preferably processed by stretching and allowing some dimensional relaxation in the cross stretch in-plane direction, so that the index of refraction difference between the birefringent material and the non-birefringent materials are relatively large along a first axis and small along the other two orthogonal axes. This results in a large optical anisotropy for electromagnetic radiation of different polarizations.

Some of the polarizers within the scope of the present invention are elliptically diffusing polarizers. In general, elliptically diffusing polarizers use fibers having a difference in index of refraction between the birefringent and non-birefringent materials along both the stretch and non-stretch directions, and may diffusely transmit or reflect light of one polarization. The birefringent material in the fiber may also form birefringent interfaces with the polymer matrix material, in which case these interfaces may also include an index mismatch for both the stretch and cross-stretch directions.

The ratio of forward-scattering to back-scattering is dependent on the difference in refractive index between the birefringent and non-birefringent materials, the concentration of the birefringent interfaces, the size and shape of the birefringent interfaces, and the overall thickness of the fiber. In general, elliptical diffusers have a relatively small difference in index of refraction between the birefringent and non-birefringent materials.

The materials selected for use in the fibers in accordance with the present invention, and the degree of orientation of these materials, are preferably chosen so that the birefringent and non-birefringent materials in the finished fiber have at least one axis for which the associated indices of refraction are substantially equal. The match of refractive indices associated with that axis, which typically, but not necessarily, is an axis transverse to the direction of orientation, results in substantially no reflection of light in that plane of polarization.

One exemplary embodiment of a polymer fiber that has internal birefringent interfaces, and that may be used in some embodiments of polarizers discussed above, is a multilayer fiber. A multilayer fiber is a fiber that contains multiple layers of different polymer materials, at least one of which is birefringent. In some exemplary embodiments, the multilayer fiber contains a series of alternating layers of a first material and a second material, where the first material is optically isotropic and the second material is birefringent, having the refractive index along one axis about the same as that of the first material and the refractive index along an orthogonal axis different from that of the isotropic material. Such structures are discussed at greater length in, for example, U.S. Pat. No. 5,882,774, incorporated herein by reference.

Figure 4A:
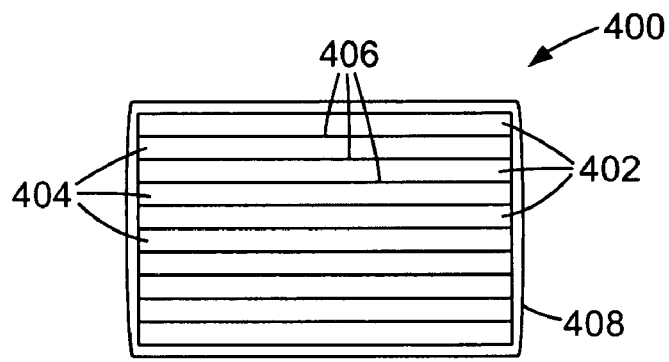
FIGS. 4A-4C schematically illustrate cross-sectional views through multilayered fibers according to principles of the present invention.
Figure 4B:
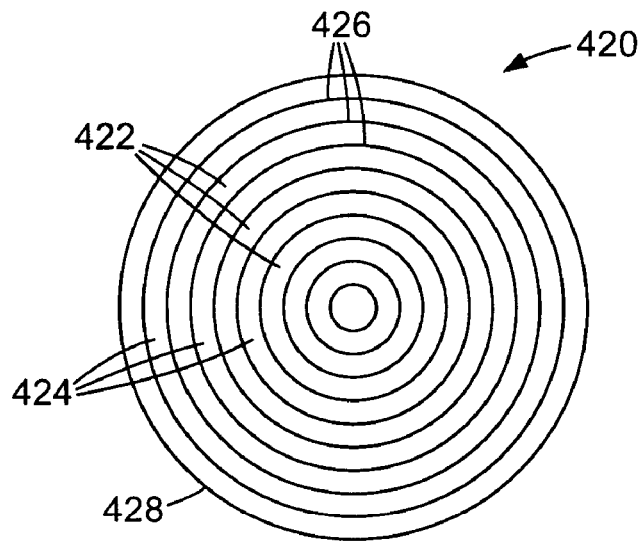

A cross-section through one exemplary embodiment of a multilayer fiber 400 is schematically illustrated in FIG. 4A. The fiber 400 contains alternating layers of a first material 402 and a second material 404. The first material is birefringent and the second material is substantially isotropic, so that the interfaces 406 between adjacent layers are birefringent. In this particular embodiment, the interfaces 406 may be substantially planar, and extend along the length of the fiber 400.

The fiber 400 may be surrounded by a cladding layer 408. The cladding layer 408 may be made of the first material 402, the second material 404, the material of the polymer matrix in which the fibers are embedded, or some other material. The cladding 408 may functionally contribute to the performance of the overall device, or the cladding 408 may perform no function. The cladding 408 may functionally improve the optics of the reflective polarizer, such as by minimizing the depolarization of light at the interface of the fiber and the matrix. Optionally, the cladding 408 may mechanically enhance the polarizer, such as by providing the desired level of adhesion between the fiber and the continuous phase material. In some embodiments, the cladding 408 may be used to provide an antireflection function, for example by providing some refractive index matching between the fiber 400 and the surrounding polymer matrix.

The fiber 400 may be formed with different numbers of layers and with different sizes, depending on the desired optical characteristics of the fiber 400. For example, the fiber 400 may be formed with from about ten layers to hundreds of layers, with an associated range in thickness. There is no limitation on the width of the fiber 400, although preferred values of the width may fall in a range from 5 µm to about 5000 µm, although the fiber width may also fall outside this range.

A multilayer fiber 400 may be fabricated by coextruding multiple layers of material into a multilayer film, followed by a subsequent step of stretching so as to orient the birefringent material and produce birefringent interfaces. Multilayer fibers may be obtained by slicing a multilayer sheet. Some approaches to manufacturing multilayer sheets containing birefringent interfaces are described further, for example, in U.S. Pat. Nos. 5,269,995; 5,389,324; and 5,612,820, incorporated by reference.

Some examples of suitable polymer materials that may be used as the birefringent material include PET, PEN and various copolymers thereof, as discussed above. Some examples of suitable polymer materials that may be used as the non-birefringent material include the optically isotropic materials discussed above.

Other configurations of multilayer fiber may be used. For example, another exemplary embodiment of multilayer fiber 420 may be formed with concentric layers of alternating first material 422 and second material 424, where the first material 422 is birefringent and the second material 424 is isotropic. In this exemplary embodiment, the fiber 420 includes concentric birefringent interfaces 426, between the alternating layers 422, 424, that extend along the fiber 420.

The outer layer 428 of the fiber 420 may be formed of one of the first and second material, the same polymer material as is used in the polymer matrix of the polarizer, or some other material.

The fiber 420 may be formed with any suitable number of layers and layer thicknesses to provide desired optical characteristics, such as reflectivity and wavelength dependence. For example, the fiber 420 may contain from 10 layers to hundreds of layers. The concentric fiber 420 may be formed by coextruding a multilayer form followed by stretching to orient the birefringent material. Any of the materials listed above for use in the flat multilayer fiber 400 may also be used in the concentric fiber 420.

Figure 4C:
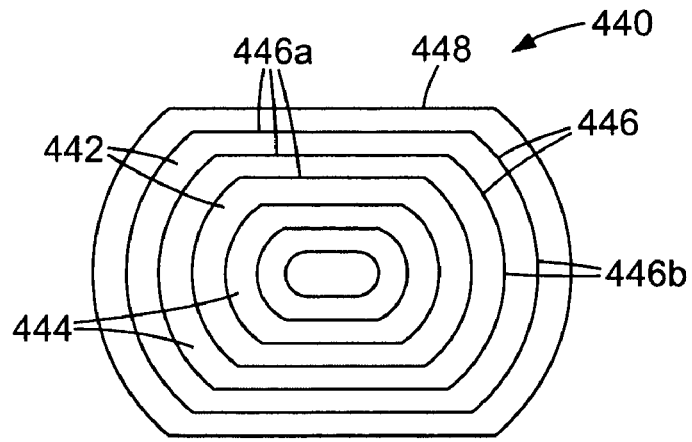

Multilayer fibers having different types of cross-sections may also be used. One such example is multilayer fiber 440, schematically illustrated in cross-section in FIG. 4C. This fiber includes multiple alternating layers of a first material 442 and a second material 444, where the first material 442 is birefringent and the second material 444 is optically isotropic. The birefringent interfaces 446 formed between the different layers have flat portions 446a and curved portions 446b and extend along the fiber 440. The particular cross-sectional shape of the different layers is determined primarily by the shape of the feedblock used to coextrude the fiber 440 and also by any subsequent forming of the fiber 440.

Figure 4D:
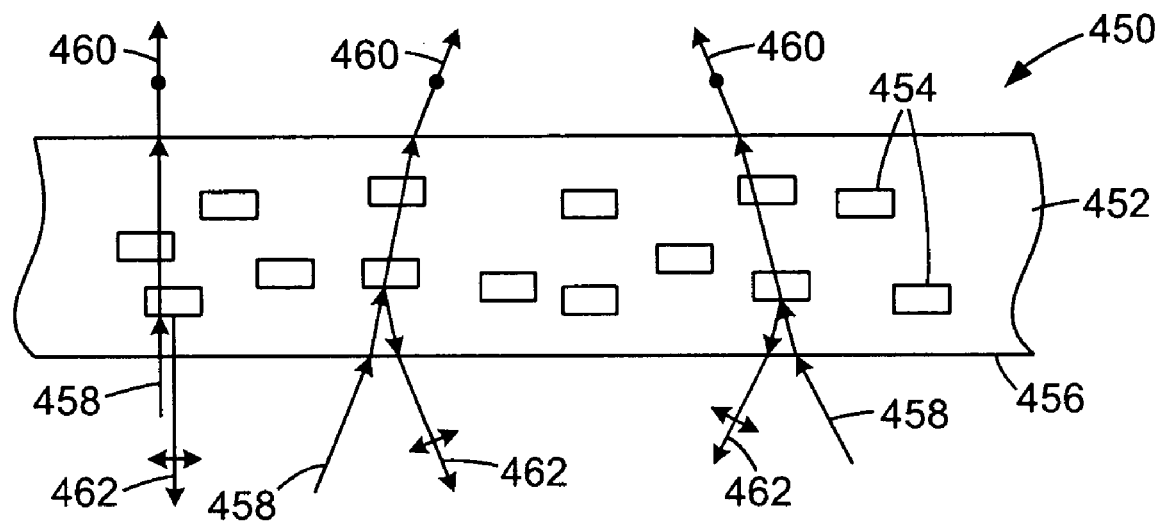
FIGS. 4D-4G schematically illustrate cross-sectional views through polarizers using multilayered fibers according to principles of the present invention.

The outer layer 448 may be formed from the first or second materials, the same material as the polymer matrix that the fiber 440 is embedded in or some other material. The material of the outer layers 408, 428, 448 may be selected to provide desired adhesion properties between the polymer fibers and the surrounding polymer matrix. For example, in some embodiments, the outer layers 408, 428, 448 may be formed of polyester resin, a silane, or some other agent used for increasing the adhesion between the polymer fibers and the polymer matrix. In other embodiments, the outer layers 408, 428, 448 may be made of a material that reduces the adhesion between the polymer fibers and the surrounding polymer matrix, for example, fluorocarbon materials, silicone materials and the like. In some embodiments, an outer layer may be used to provide an antireflection function, for example by providing some refractive index matching between the polymer fibers and the polymer matrix.

Where the multilayer fiber contains birefringent interfaces having flat portions on the fiber cross-section, the orientation of the flat portions may be controlled within the polarizer to provide a range of selected effects. For example, in an exemplary embodiment of a polarizer 450, schematically illustrated in FIG. 4D, the polarizer 450 includes a matrix 452 embedded with fibers 454 whose birefringent interfaces are generally aligned parallel with the surface 456 of the polarizer 450. Where incident light 458 is unpolarized, the polarizer passes light 460 in one polarization state and reflects light 462 in the orthogonal polarization state. In the illustrated embodiment, the transmitted light 460 is polarized out of the plane of the figure and the reflected light 462 is polarized parallel to the plane of the figure.

In this exemplary embodiment, the reflected light 462 may include a significant specular component since the birefringent interfaces of the fibers 454 are aligned parallel to each other. The reflected light 462 may also include a diffuse component, for example due to surface and diffractive effects, and also because of misalignments from true parallelism among the fibers 454. Furthermore, since the birefringent interfaces are aligned parallel to the surface 456, the polarizer 450 behaves somewhat like a mirror for light in the reflected polarization state.

Figure 4E:
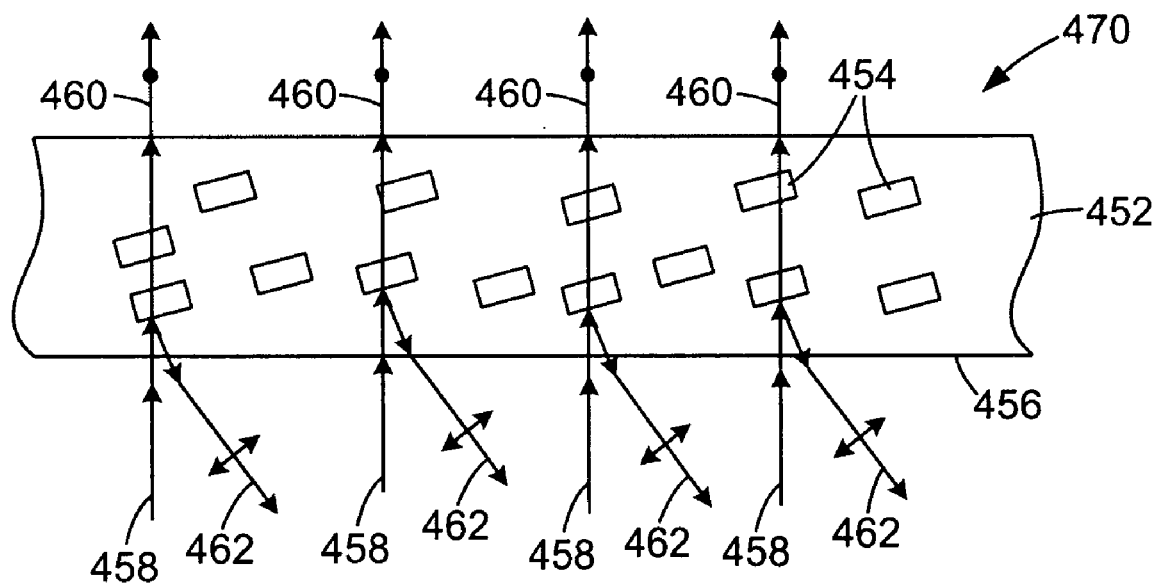

Another exemplary embodiment of polarizer 470 is schematically illustrated in cross-section in FIG. 4E. In this polarizer 470, the fibers 454 are aligned with the flat portions of the birefringent interfaces substantially parallel to each other. In this case, however, the flat portions of the birefringent interfaces are not aligned parallel to the surface 456, but are aligned non-parallel to the surface 456. Unpolarized incident light 458 results in the transmission of light 460 in the transmission polarization state and the reflection of light 462 in the reflection polarization state. In this case, when the incident light is normally incident on the surface 456, the reflected light 462 may generally be reflected in a direction non-normal to the surface 456. The reflected light 462 may be said to be directed to the side of the polarizer 470.

Figure 4F:
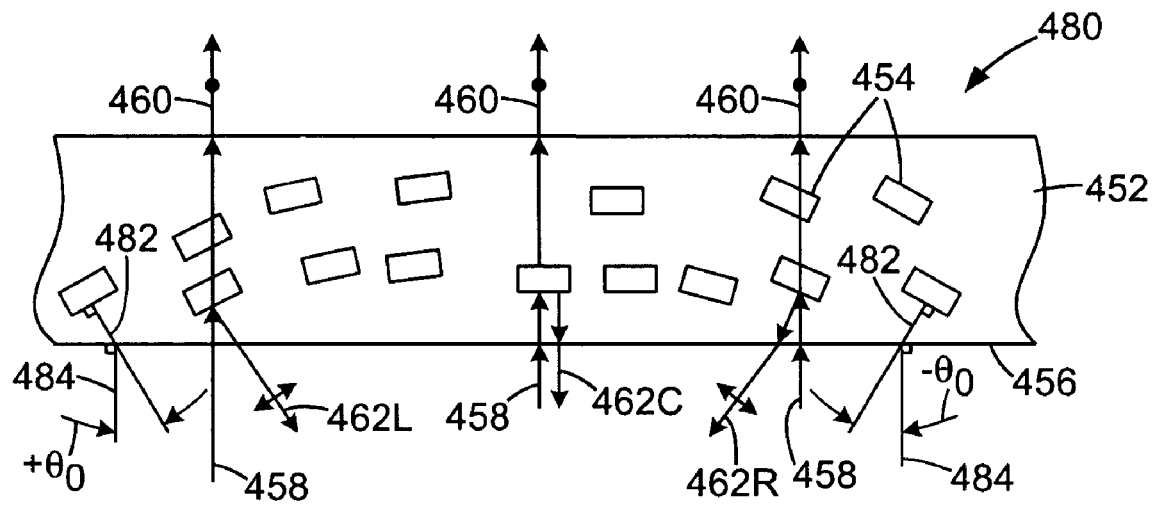

Another exemplary embodiment of polarizer 480 is schematically illustrated in cross-section in FIG. 4F. In this polarizer 480, the fibers 454 are not aligned with the flat portions of the birefringent interfaces all parallel, but are oriented with a desired orientation profile across the polarizer 480. For the purposes of description, it is useful to define an angle $\theta$, formed between a normal 482 to the flat portions of the birefringent interfaces and a normal 484 to the surface 456. The value of $\theta$ may vary across the polarizer 480. In the illustrated embodiment, the fibers 454 towards the left side of the polarizer 480 are oriented so that the value of $\theta$ is $+\theta_0$. Thus, the light 462L reflected from this portion of the polarizer 480 is directed towards the right. The fibers 454 towards the right side of the polarizer 480 are oriented so that that the value of $\theta$ is $-\theta_0$, and so the light 462R reflected from this side of the polarizer is directed towards the left. At the center of the polarizer, the normals 482, 484 to the flat portions of the birefringent interfaces and the surface 456 are approximately parallel (i.e., $\theta=0$) and so the light 462C reflected at the center of the polarizer 480 is reflected at approximately the angle of incidence on the surface 456.

It will be appreciated that the manner in which $\theta$ varies across the polarizer 480 may be selected so as to reflect light with a predetermined profile. For example, in the illustrated embodiment, the reflected light may be approximately brought to a focus in front of the polarizer. In another exemplary embodiment, not illustrated, the flat portions of the birefringent interfaces may be oriented so that the reflected light is brought to a focus to the side of the polarizer, rather than in front of the polarizer.

Figure 4G:
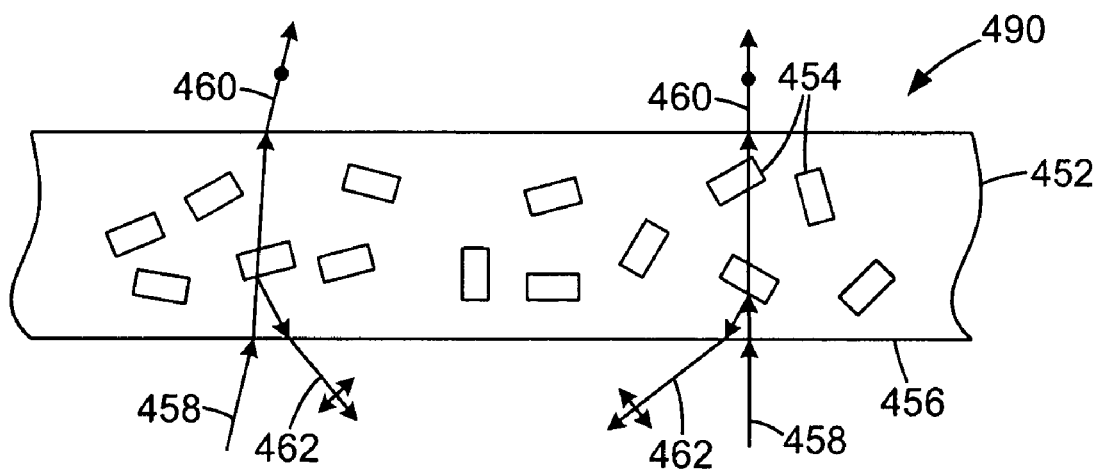

Another exemplary embodiment of a polarizer 490 is schematically illustrated in FIG. 4G. In this polarizer 490, the flat portions of the birefringent interfaces of different fibers 454 are oriented randomly. As a result, the reflected light 462 is reflected more or less diffusely.

It will be appreciated that the relative orientations of the flat portions of the birefringent interfaces may be selected so that the reflected light is more or less specularly reflected or diffusely reflected, or reflected with some combination of specular and diffuse characteristics.

In some exemplary embodiments, the fibers 454 maintain a constant orientation, relative to the surface 456, along their length. In other exemplary embodiments, some or all of the fibers 454 may be twisted along their length.

Figure 5A:
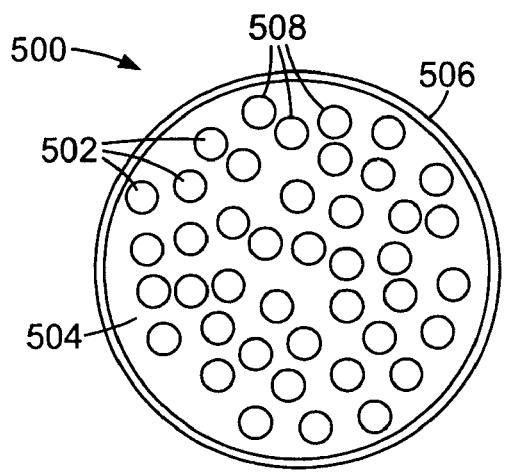
FIGS. 5A-5K schematically illustrate cross-sectional views through embodiments of composite fibers according to principles of the present invention.

Another exemplary embodiment of a polymer fiber that has internal birefringent interfaces is a composite fiber, which contains multiple scattering fibers infiltrated with a polymer filler. An example of a cross-section through an exemplary composite fiber is schematically illustrated in FIG. 5A. The composite fiber 500 includes multiple scattering fibers 502 with a filler 504 between the scattering fibers 502. In some embodiments, at least one of the scattering fibers 502 or the filler 504 is birefringent. For example, in some exemplary embodiments, at least some of the scattering fibers 502 may be formed of a birefringent material and the filler material 504 may be non-birefringent. In other exemplary embodiments, the scattering fibers 502 may be non-birefringent while the filler material 504 is birefringent. In other embodiments, both the scattering fibers 502 and the filler 504 may be birefringent. In these different variations, each interface 508 between the material of a scattering fiber 502 and the filler material 504 is an interface between a birefringent material and another material, i.e., is a birefringent interface, and can contribute to the preferential reflection or scattering of light in a selected polarization state. In each of these different embodiments, the polymer matrix, in which the composite fiber is embedded, may be optically isotropic or birefringent.

In some other embodiments, the fibers 500 may be made from isotropic scattering fibers 502 with an isotropic filler material 504. In such a case, the matrix in which the fibers 500 are embedded is birefringent.

The composite fiber 500 can take on different cross-sectional shapes. In FIG. 5A, the composite fiber 500 has a circular cross-sectional shape. Other exemplary embodiments of composite fibers 510 and 520, shown schematically in FIGS. 5B and 5C respectively, have elliptical and square cross-sectional shapes. Other cross-sectional shapes may be used, for example regular and irregular polygonal shapes, or cross-sectional shapes that combine curved and straight sides. The illustrated embodiments are intended to be exemplary only, and not to be limiting in any way.

A composite fiber may optionally be provided with an outer layer 506. The outer layer 506 may be used, for example, to affect the adhesion between the composite fiber and the polymer matrix in which the composite fiber is embedded. In some embodiments, the outer layer 506 may be formed of a material that increases the adhesion between the composite fiber and the polymer matrix, for example a polyester resin coating, a silane coating or other primer used for increasing the adhesion between the polymer matrix and the polymer fibers. In other embodiments, the outer layers 506 may be made of a material that reduces the adhesion between the polymer fibers and the surrounding polymer matrix, for example, fluorocarbon materials, silicone materials and the like. In some embodiments, the outer layer 506 may be used to provide an antireflection function, for example by providing some refractive index matching between the fiber 500 and the surrounding polymer matrix.

Figure 5B:
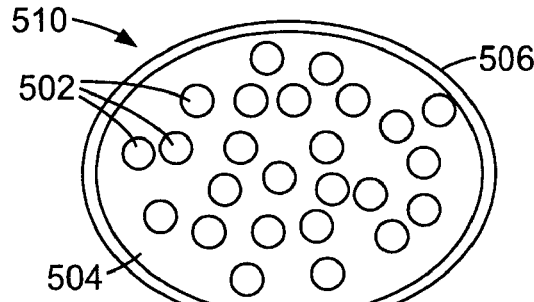
Figure 5C:
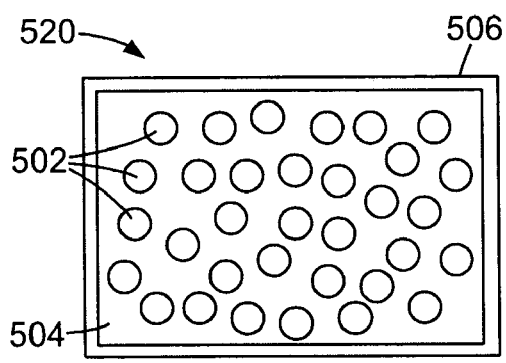
Figure 5D:
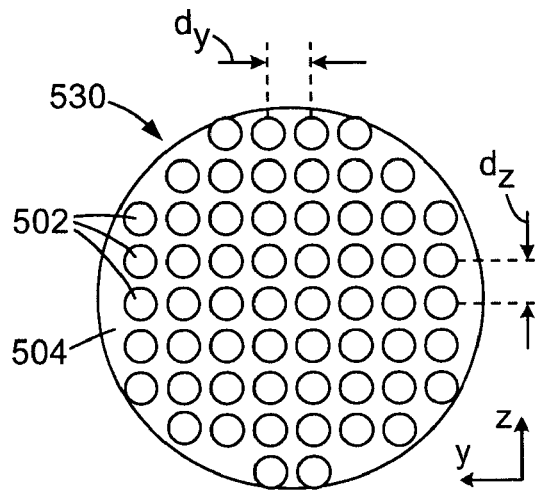
Figure 5E:
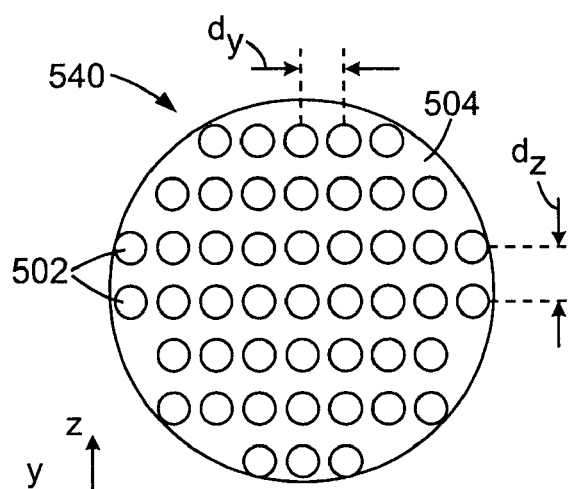

The positions of the scattering fibers may be random within the cross-section of the composite fiber, for example as schematically illustrated in the exemplary embodiments of FIGS. 5A-5C. Other cross-sectional arrangements of the scattering fibers may be used. For example, the scattering fibers 502 may be regularly arranged within the cross-section of the composite fiber 530. For example, the exemplary embodiment of fiber 530 illustrated in FIG. 5D shows the scattering fibers 502 arranged in a two dimensional array where the separation distance between adjacent scattering fibers 502 in the y-direction, $d_y$, is the same as the separation distance between adjacent scattering fibers 502 in the z-direction, $d_z$. In the exemplary embodiment of fiber 540, illustrated in FIG. 5E, the scattering fibers 502 are arranged in a two dimensional array where the separation distance, $d_y$, in the y-direction is different from the separation distance $d_z$ in the z-direction. The scattering fibers 502 in FIGS. 5D and 5E lie in a rectangular grid pattern, which is understood to include the square grid pattern of FIG. 5D. The spacing between adjacent scattering fibers 502 may be, for example, in the range 50 nm-500 nm, where the composite fiber 530, 540 is to be used with visible light.

Figure 5F:
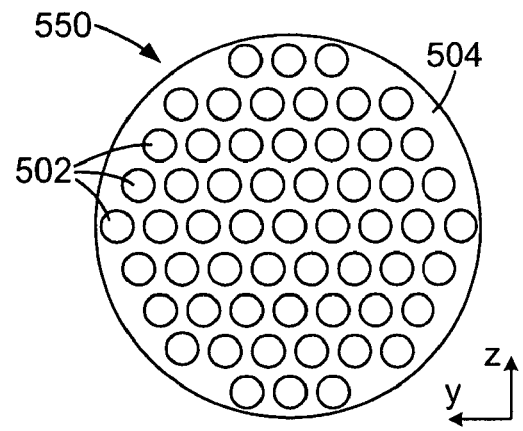
Figure 5G:
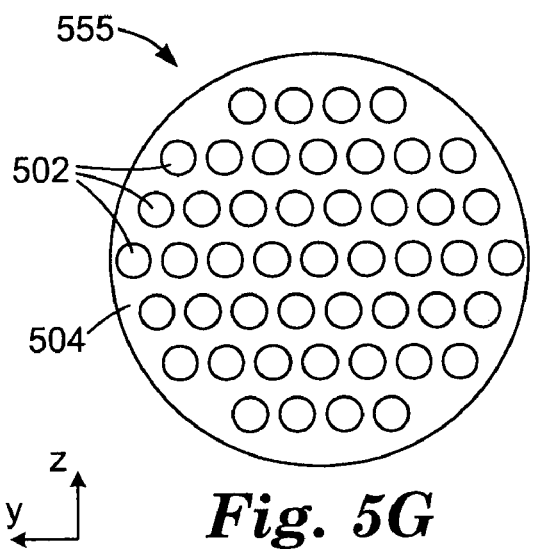

Other regular arrangements of the scattering fibers 502 are possible. For example, in the composite fiber 550, schematically illustrated in cross-section in FIG. 5F, the scattering fibers 502 lie in rows along the y-direction where adjacent rows are offset from each other in the y-direction. In this particular embodiment, the offset between adjacent rows is such that the scattering fibers 502 are arranged in a hexagonal pattern, rather than a square or rectangular pattern. A variation of the arrangement in FIG. 5F is schematically illustrated for composite fiber 555 in FIG. 5G, where the separation between nearest neighbor scattering fibers 502 is greater in the z-direction than in the y-direction.

In other exemplary embodiments, the scattering fibers 502 may form other patterns. For example, the scattering fibers may be arranged so as to fill some, but not all, positions in a regular array. Furthermore, spaces or gaps may be introduced between adjacent scattering fibers or groups of scattering fibers. The size and distribution of such groups or spaces and gaps may be selected to produce particularly desirable spectral characteristics. For example some arrangements of scattering fibers may act as photonic crystals for light within particular wavelength ranges, which may lead to spectrally selective reflection and/or transmission. Photonic crystal photonic fibers are discussed further in co-owned U.S. patent application Ser. No. 11/068,158, titled "COMPOSITE POLYMER FIBERS", filed on even date herewith, and incorporated herein by reference.

Additional exemplary embodiments of composite fiber, showing an inexhaustive selection of possible scattering fiber arrangements is now described.

Figure 5H:
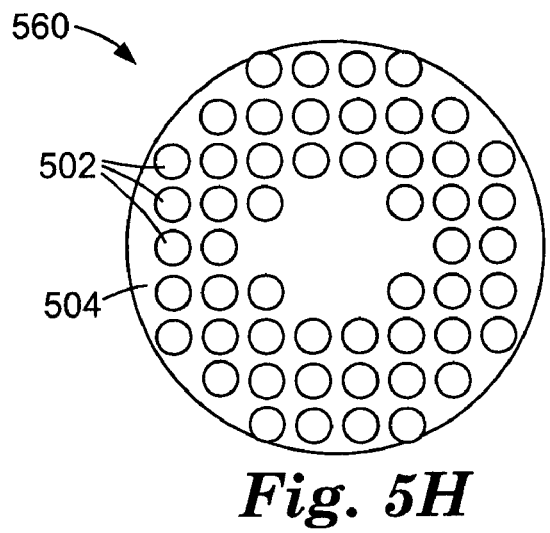
Figure 5I:
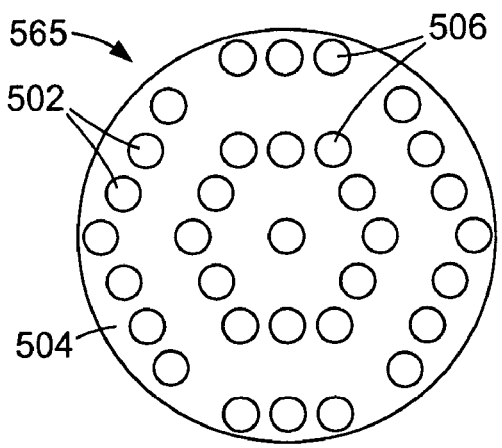
Figure 5J:
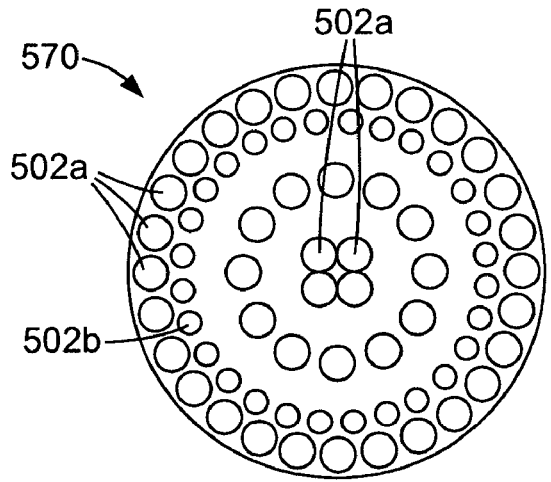

In the exemplary embodiment of composite fiber 560 schematically illustrated in FIG. 5H, some scattering fibers 502 are arranged regularly in an area around the center of the fiber 560, but the center portion of the fiber 560 is clear of scattering fibers. In another example of composite fiber 565, schematically illustrated in FIG. 5I, the scattering fibers 502 are arranged in concentric rings 506. The size of the scattering fibers 502 and the size of the gap and/or the concentric rings may be selected for particular optical properties, such as transmission and/or reflection. In the example illustrated in FIG. 5I, the scattering fibers are shown to be located in a ring at positions set by a hexagonal grid. This is not a necessary condition, and the scattering fibers 502 may be formed in a radially concentric pattern, for example as is schematically illustrated in FIG. 5J.

Figure 5K:
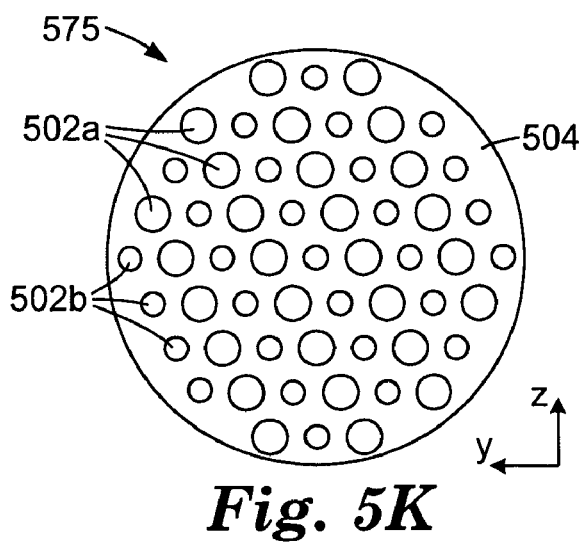

In some embodiments, the scattering fibers 502 need not all be the same size. For example, as is shown for the embodiments of composite fiber 570 and 575 illustrated in FIGS. 5J and 5K, the composite fiber may include scattering fibers of different cross-sectional sizes. In these particular embodiments, the scattering fibers 502a are relatively larger in cross-section than the scattering fibers 502b. The scattering fibers 502 may fall into groups of at least two different sizes and, in fact, may all be different sizes. Furthermore, a scattering fiber 502 may be located at the center of the composite fiber, for example as illustrated in FIG. 5I, or there may be no scattering fiber 502 at the center of the composite fiber: for example, scattering fibers 502a are positioned surrounding, but not at, the center of the composite fiber 570 in FIG. 5J. In practice, the dimensions of the scattering fibers 502 may fall within a range, rather than being single-valued. In addition, different scattering fibers 502 may be formed of different materials.

Figure 6A:
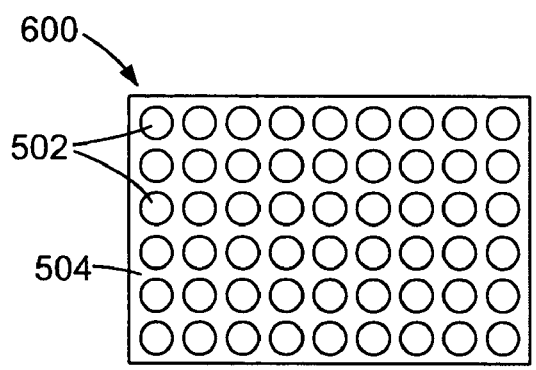
FIGS. 6A-6I schematically illustrate cross-sectional views through embodiments of composite fibers according to principles of the present invention.
Figure 6B:
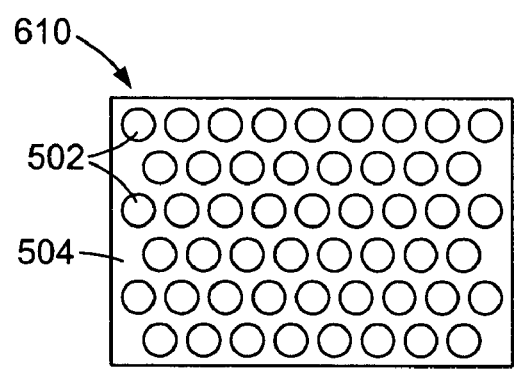
Figure 6C:
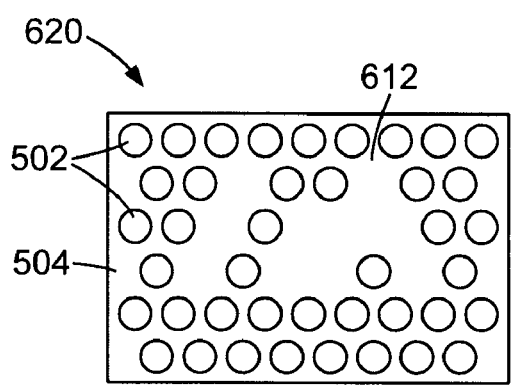

As have been discussed above, the composite fiber need not be circular in shape, and may have a non-circular cross-section. In illustration, FIGS. 6A and 6B show non-circular composite fibers 600, 610 that contain scattering fibers 502 in square and hexagonal patterns respectively. The non-circular fiber may have its scattering fibers 502 positioned at points on a regular grid pattern, but not all positions of the grid pattern need be associated with a scattering fiber 502. For example, the non-circular composite fiber 620 schematically illustrated in FIG. 6C contains scattering fibers 502 positioned on a hexagonal grid, but some gaps 612 may be present between fibers. In addition, the pattern formed by the scattering fibers 502 has no axis of symmetry.

Figure 6D:
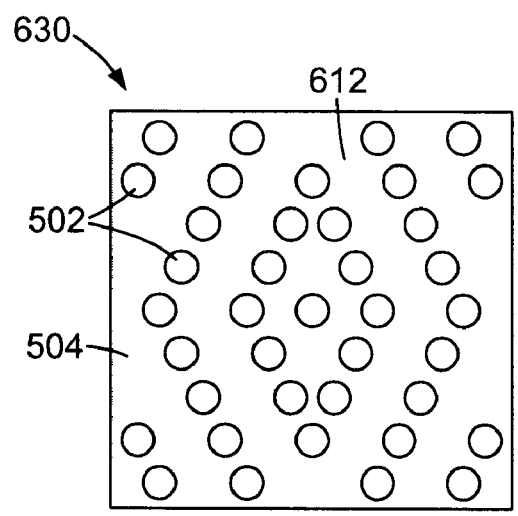
Figure 6E:
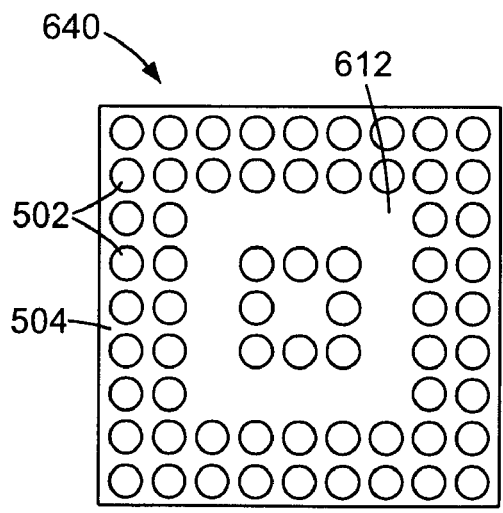

Other exemplary embodiments of non-circular composite fibers 630, 640 are schematically illustrated in FIGS. 6D and 6E. These exemplary non-circular composite fibers 630, 640 are square in cross-section and contain scattering fibers 502 arranged in different exemplary patterns. The scattering fibers 502 in composite fiber 630 are arranged on a hexagonal grid pattern, whereas the scattering fibers 502 in composite fiber 640 are arranged in a square grid pattern. In each case, there are gaps within the arrangement of scattering fibers 502.

The scope of the invention is intended to cover all arrangements of scattering fibers within the composite fibers. In some exemplary arrangements, the relative positions of the scattering fibers, the size of the scattering fibers and the difference in the refractive index between the scattering fibers and the filler materials may be set to provide desired spectrally selective properties, for example in reflection and/or transmission, to the composite fiber. Examples of such spectrally selective properties include, but are not limited to, reflection and transmission. In some embodiments of composite fiber, the cross-sectional locations of the scattering fibers may lead to incoherent scattering of the incident light. In other embodiments, the locations of the scattering fibers may lead to coherent effects in the scattered light that give rise to photonic crystalline properties. The average density of scattering fibers within the composite fiber may cover a large range, for example about 1% to about 95%, preferably about 10% to about 90% and more preferably about 10% to about 50%, although the scattering fiber density may also fall outside these ranges. Composite fibers are discussed in greater detail in co-owned U.S. patent application Ser. No. 11/068,158, titled "COMPOSITE POLYMER FIBERS", filed on even date herewith.

Figure 7:
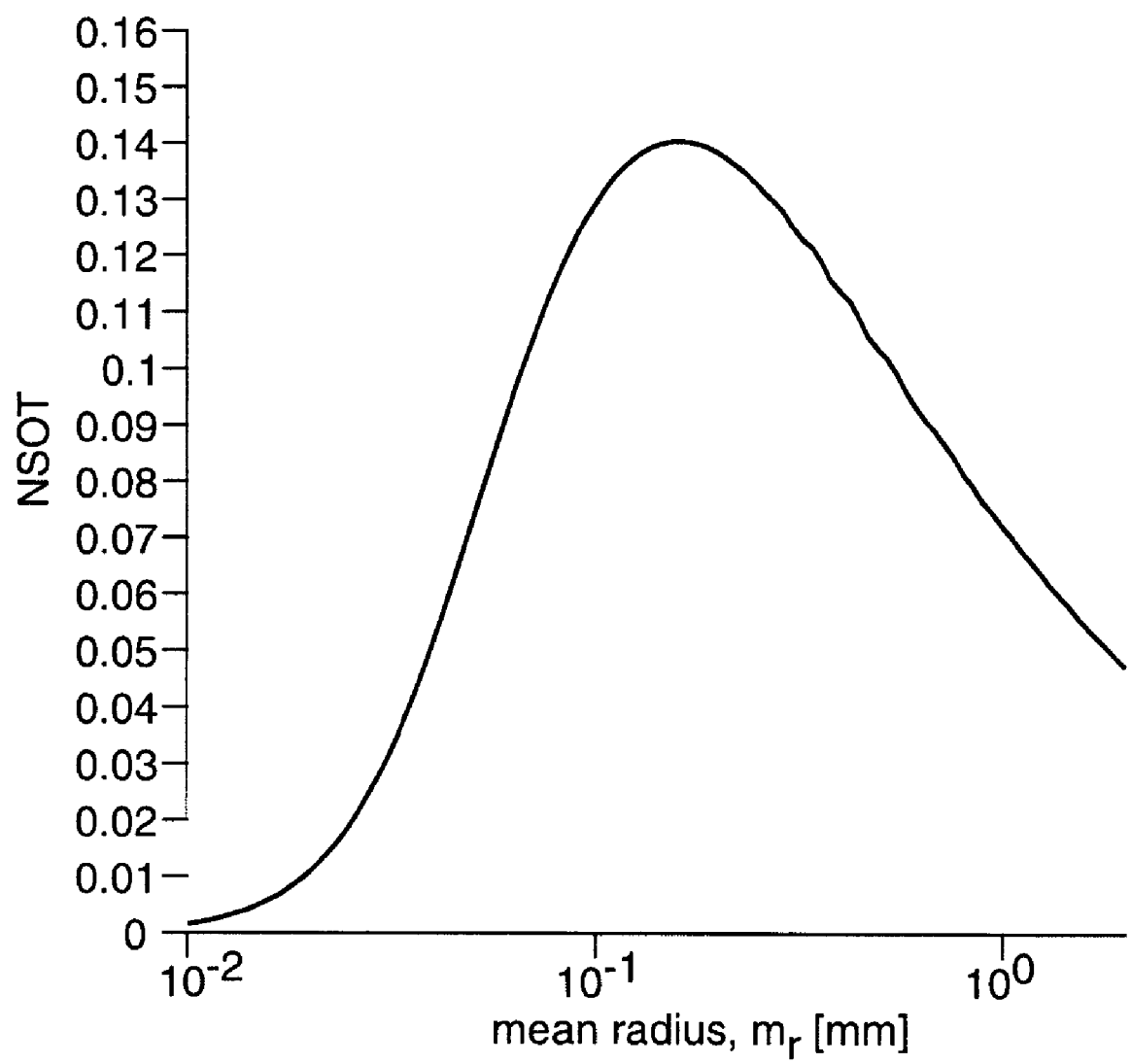
FIG. 7 presents a graph showing light scattering efficiency as a function of scattering fiber radius.

The size of the scattering fibers 502 can have a significant effect on scattering. A plot of scattering effectiveness, the normalized, scaled optical thickness (NSOT), is shown as a function of mean radius of the scattering fiber, in FIG. 7. The NSOT is given by the following expression:

$$NSOT = T(1-g)/(tf)$$

where T is the optical thickness and equals tk, where k is the extinction cross-section per unit volume (the reciprocal of the mean free path for extinction), t is the thickness of the diffuser, f is the volume fraction of diffusers and g is the asymmetry parameter. The value of g is +1 for pure forward-scattering, −1 for pure back-scattering and zero for equally forward and backward scattering. The calculation used to produce the plot assumed that the vacuum wavelength of the incident light was 550 nm.

As can be seen, the scattering effectiveness peaks at a radius of about 150 nm, and has a value of about half the maximum over a radius range of about 50 nm-1000 nm. The scattering fibers may have any desired cross-sectional dimension, but the cross-sectional dimension may be in the range of about 50 nm to about 2000 nm, and more preferably in the range of about 100 nm to about 1000 nm, for light centered at a wavelength of about 550 nm. The cross-sectional dimension is the diameter where the scattering fiber has an approximately circular cross-section, and may be taken as the scattering fiber width for non-circular fiber cross-sections. The size of the scattering fibers may be different where the composite fiber is being used for applications where the wavelength of the incident light lies outside the visible region of the spectrum, for example in the ultraviolet or infrared regions. In general, a preferred range for the cross-sectional dimension of the scattering fibers is around $\lambda/10$ to around $4\lambda$, where $\lambda$ is the vacuum wavelength of the light. Where the light is present in a range of wavelengths, the value of $\lambda$ may taken as the center value of the wavelength range, although the composite fiber may also be provided with scattering fibers having a range of dimensions.

If the scattering fibers are too small, for example less than about one thirtieth of the wavelength of light within the composite fiber, or below about 0.012 μm for light at 550 nm in vacuum, and if the density of scattering fibers is sufficiently high, for example in the range of about 60%-80% of the composite fiber volume, then the polarizer may behave as a medium with an effective refractive index somewhat between the indices of the scattering fiber and the filler along any given axis. In such a case, little light is scattered. When the scattering fiber's cross-sectional size becomes significantly larger than the light wavelength, for example at least about three times the wavelength or more, the scattering efficiency becomes very low and iridescence effects can occur.

The cross-sectional dimensions of the scattering fibers can vary depending on the desired use of the optical material. Thus, for example, the dimensions of the scattering fibers may vary depending on the wavelength of light that is of interest in a particular application, with different dimensions required for scattering or transmitting visible, ultraviolet, and infrared light. Generally, however, the dimension of the scattering fibers should be approximately greater than about one thirtieth of the smallest wavelength of light in the wavelength range of interest, in the material.

At the upper side of the desired dimensional range, the average dimension of the scattering fibers is preferably equal to or less than twice the wavelength of light over the wavelength range of interest, in the material, and preferably less than 0.5 of the desired wavelength.

The density of the scattering fibers within the composite fiber affects the amount of scattering that takes place. It may be useful for the center-to-center spacing between the scattering fibers to be about $\lambda/10$ to about $2\lambda$, where $\lambda$ is the center or average vacuum wavelength of the incident light.

Figure 6F:
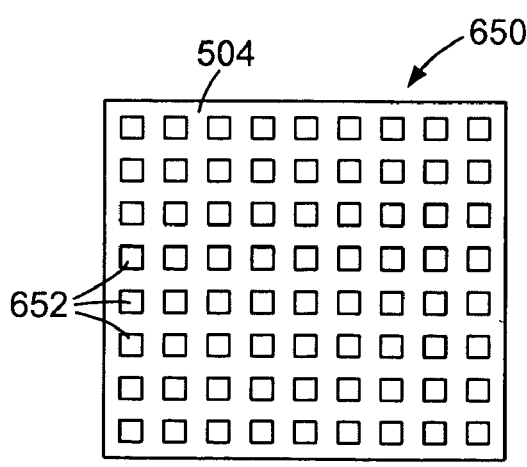

The scattering fibers may be round in cross-section, but need not be round and may have other cross-sectional shapes. In the exemplary composite fiber 650, schematically illustrated in cross-section in FIG. 6F, the scattering fibers 652 have a square cross-section. Other shapes of cross-section may be used, for example regular and irregular polygonal shapes, such as triangular, rectangular or hexagonal, or cross-sectional shapes that combine curved and straight sides. The cross-sectional shape of the scattering fibers may be a result of the shape of the extrusion die, or may be a result of post-processing the optical element after extrusion. The intention is not to limit the invention to scattering fibers having those cross-sectional shapes shown in the illustrations.

The use of scattering fibers having non-circular cross-sections is useful when the center-to-center fiber spacing is non-uniform, since it permits the scattering fibers to fill a greater fraction of the cross-sectional area of the composite fiber. For example, if the scattering fibers are arranged on a rectangular grid and the center-to-center spacing is twice as large in the y-direction as the z-direction, the scattering fibers fill a greater cross-section of the composite fiber if the scattering fibers have an elliptical cross-section that is twice as long in the y-direction than the z-direction than if the scattering fibers were circular.

Figure 6G:
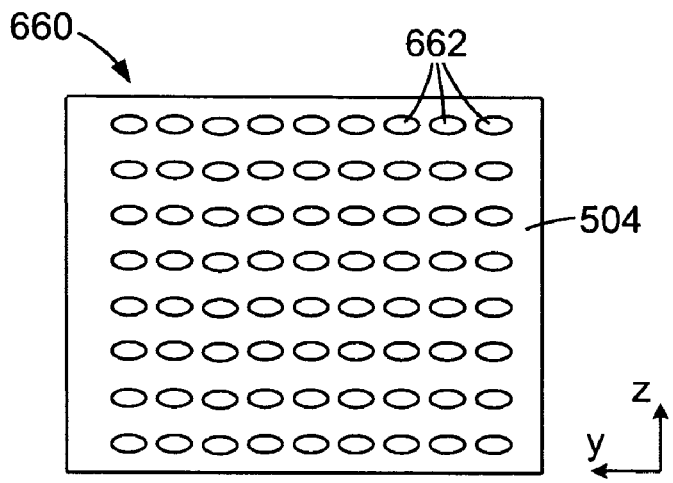
Figure 6H:
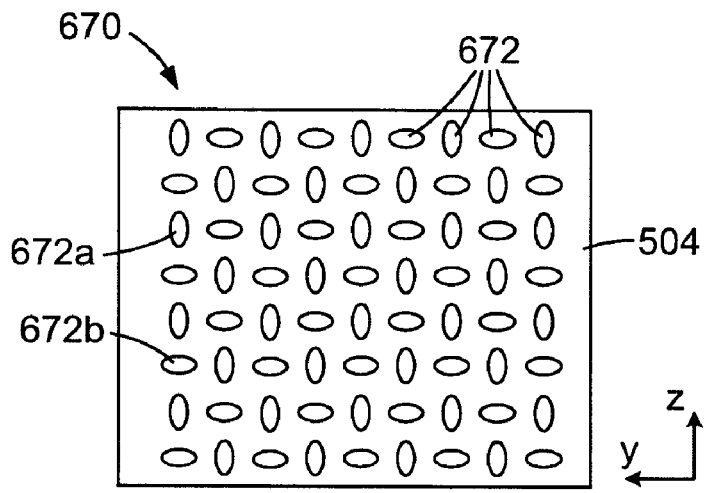
Figure 6I:
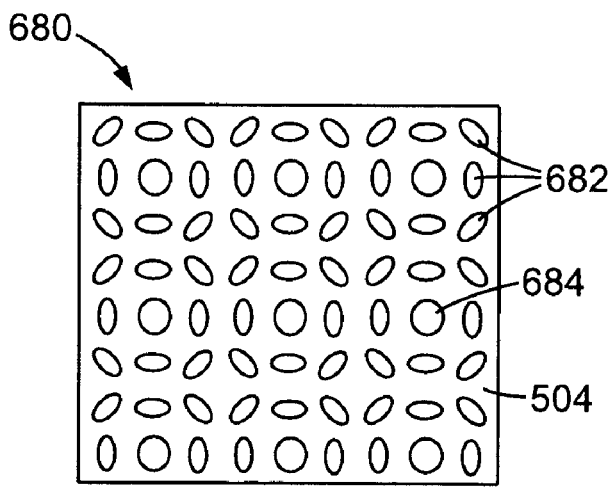

Some additional exemplary arrangements of scattering fibers having non-circular cross-section are schematically illustrated in FIGS. 6G-6I. The non-circular scattering fibers may be arranged with their cross-sectional shapes arranged in random directions. In other embodiments, the cross-sections of the scattering fibers may be aligned relative to each other. For example, in FIG. 6G, the composite fiber 660 is formed with a filler 504 embedded with scattering fibers 662 having an elliptical cross-section. In this particular embodiment, the scattering fibers 662 are aligned with the long axes of their cross-sectional ellipses parallel with the y-axis.

The scattering fibers need not be arranged with their cross-sections all in alignment, but different scattering fibers may have different alignments within the composite fiber. In the exemplary embodiment of composite fiber 670, schematically illustrated in FIG. 6H, the scattering fibers 672 have an elliptical cross-section and some fibers 672a are arranged with their long axes parallel to the z-axis while other fibers 672b are arranged with their short axes parallel to the z-axis. Approximately half of the scattering fibers 672 are aligned in each direction. Also, the populations of the fibers 672a and 672b are arranged regularly within the cross-section of the composite fiber 670. It will be appreciated that the populations of the fibers 672a and 672b may also be arranged irregularly within the cross-section of the composite fiber 670.

Other variations on the illustrated embodiments are possible. For example, not all scattering fibers need have the same cross-sectional shape, size or alignment. Furthermore, the scattering fibers may be cross-sectionally aligned to form patterns within the composite fiber. One particular example of such a composite fiber 680 is schematically illustrated in FIG. 6I. The filler 504 is embedded with scattering fibers having two different shapes of cross-section, elliptical fibers 682 and circular fibers 684. In the illustrated embodiment, the elliptical fibers 682 are aligned so that the short axes of their elliptical cross-sections are directed towards the closest circular fiber 684. Other patterns of scattering fibers may be used.

Where the scattering fibers have a non-circular cross-section, the scattering fibers may lie untwisted within the composite fiber, so that a face of the scattering fiber is oriented towards one face of the composite fiber along the length of the scattering fiber. In other exemplary embodiments, the scattering fibers may be twisted within the composite fiber, so that, at different points along the length of a scattering fiber, a face of the scattering fiber is oriented towards different faces of the composite fiber.

In many embodiments of composite fiber, the birefringent interfaces may be curved or may be flat and unaligned. In such embodiments, the light is reflected at the birefringent interfaces in many different directions and so the composite fiber may be described as scattering the light.

While the index mismatch is the predominant factor relied upon to promote polarization dependent scattering within composite fibers, the cross-sectional shape of the composite fibers may also have an effect on scattering. For example, when the scattering fiber is elliptical in a cross-section, the elliptical cross-sectional shape may contribute to asymmetric diffusion in both back scattered light and forward scattered light. The effect can either add or detract from the amount of scattering from the index mismatch.

In some embodiments, the scattering fibers may have a core and shell construction, wherein the core and shell are made out of the same or different materials, or wherein the core is hollow. Thus, for example, the scattering fibers may be hollow fibers of uniform or non-uniform cross section. The interior space of the fibers may be empty, or may be occupied by a suitable medium which may be a solid, liquid, or gas, and may be organic or inorganic. The refractive index of the medium may be chosen in consideration of the refractive index difference at the birefringent interfaces so as to achieve a desired degree of reflection or scattering at the birefringent interface. Suitable isotropic and birefringent polymer materials have been discussed above.

One method of making a composite fiber is to coextrude multiple scattering fibers using feedblocks designed for manufacturing composite fibers, sometimes also known as "island-in-the-sea" fibers. Such methods are discussed in greater detail in Handbook of Fiber Science and Technology: High Technology Fibers Part D, Vol. 3; Lewin and Preston (editors), Marcel Dekker, 1996, ISBN 0-8247-9470-2, incorporated by reference. Other fiber structures and cross-sectional distributions, including those described in this reference, may be used. The composite fibers may be stretched following extrusion, to orient the birefringent material. A more detailed description of methods for coextruding elements containing scattering fibers is presented in U.S. patent application Ser. No. 11/068,159, "COMPOSITE POLYMERIC OPTICAL FILMS WITH CO-CONTINUOUS PHASES", filed on even date herewith and incorporated herein by reference.

EXAMPLE

Figure 14:
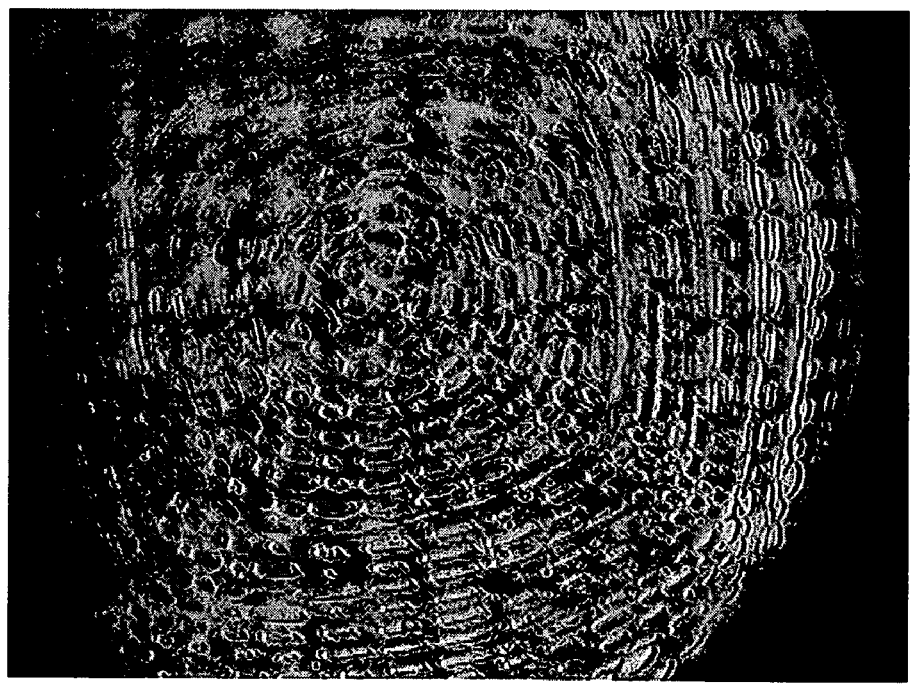
FIG. 14 shows a photograph illustrating a cross-section through a scattering fiber that may be used in a polarizer according to principles of the present invention.

In an example of coextruding a composite fiber, a feedblock, having one hundred and eighteen laser-machined plates and eleven end-milled plates, was assembled to have two input ports and about 1000 "island" output ports. Within the feedblock, the polymer paths are all of substantially equal length. A cross-section through the resulting coextrudant composite fiber is shown in the photograph in FIG. 14. The composite fiber comprised a PEN (90%)/PET (10%) copolymer, as the scattering fiber "islands" in a filler "sea" of a PETG copolyester, Eastar™ 6763, supplied by Eastman Chemical Co., Kingsport, Tenn. The extruded composite fiber is about 200 µm in diameter. The composite fiber was not stretched but, with stretching while maintaining geometric shape, could reach a diameter of around 25 µm, i.e., a reduction in diameter of around 87%. At such a stretch, the spacing between the scattering fibers would be about 500 nm. The cross-sectional dimensions of the scattering fibers will depend on the ratio of the flow rates of the two different polymer materials.

Appropriate optical properties of the polymer fibers can be achieved as previously described with birefringent interfaces through the use of fiber internal structures including multilayer configurations, both concentric and planar, and multiple small scattering fibers within a composite fiber ("islands-in-the-sea" fiber), or through other approaches. Another method for generating the desired internal structure that contains polymer birefringent interfaces in a fiber is to use two polymers which are not miscible (and at least one of which is birefringent) and extrude or cast or form them into a fiber. Upon processing, a continuous phase and a dispersed phase are generated. With subsequent processing or orientation, the dispersed phase can assume rod-like or layered structures, depending on the internal structure of the polymer fiber. Furthermore, the polymer materials may be oriented so that there is substantial refractive index matching between the two materials for one polarization direction and a relatively large index mismatch for the other polarization. The generation of a dispersed phase in a film matrix is described in greater detail in U.S. Pat. No. 6,141,149, included herein by reference.

Figure 8A:
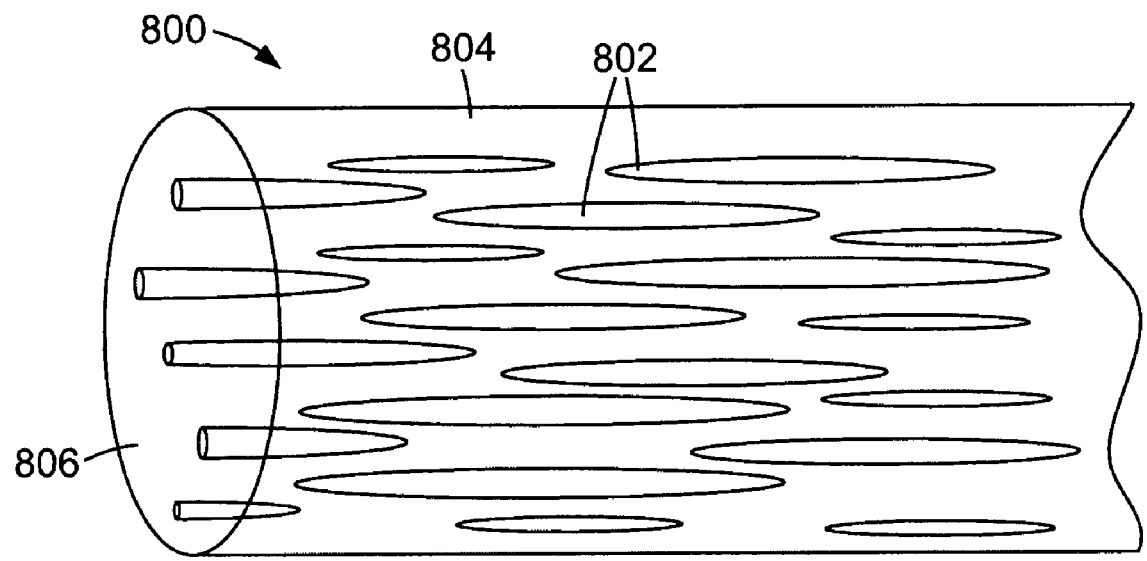
FIG. 8A schematically illustrates an embodiment of a disperse phase birefringent polymer fiber according to principles of the present invention.

This type of birefringent polymer fiber may be referred to as a dispersed phase fiber. An example of a dispersed phase fiber 800 is schematically illustrated in FIG. 8A, the dispersed phase 802 within the continuous phase 804. The end face 806 is a cross-section to show the random distribution of dispersed phase portions 802 across the cross-section of the fiber 800. The interfaces between the matrix 804 and the dispersed phase 802 are birefringent interfaces, and so polarization sensitive reflection or scattering occurs at the interfaces.

The dispersed phase may also be formed of liquid crystal droplets, liquid crystal polymers or polymers. The dispersed phase could, alternatively, be comprised of air (microvoids). In any case, the interfaces between the dispersed and continuous phases within the dispersed phase fiber can induce desired optical properties, including reflective polarization.

Figure 8B:
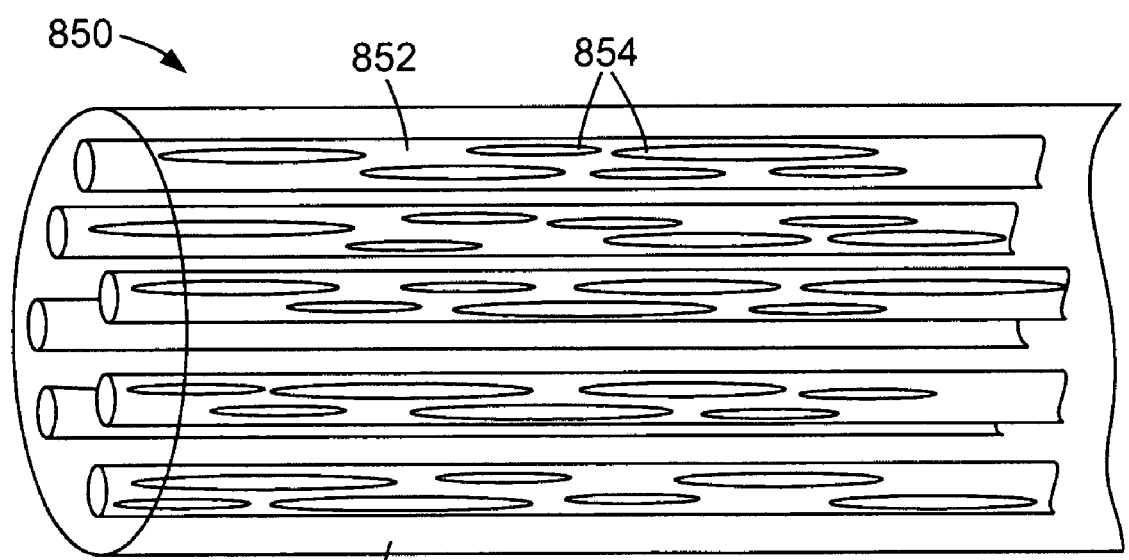
FIG. 8B schematically illustrates an embodiment of a disperse phase birefringent composite polymer fiber according to principles of the present invention.

In another approach to forming a birefringent polymer fiber, a fiber may be formed in a manner similar to a composite fiber, with a first polymer being used as the filler, but with second and third polymers being used for the scattering fibers. In some embodiments, the second and third polymers are not miscible with each other, and at least one of the second and third polymers is birefringent. The second and third polymers may be mixed and extruded as scattering fibers in a composite fiber. Upon processing, the first polymer forms the filler portion of the composite fiber, and the scattering fibers contain both a continuous phase and a dispersed phase, from the second and third polymers, respectively. This type of fiber is referred to as a dispersed phase composite fiber. An example of a dispersed phase composite fiber 850 is schematically illustrated in FIG. 8B, showing scattering fibers 852 that include disperse phases 854. The scattering fibers 852 are surrounded by the filler 856. In other embodiments, the scattering fibers may be formed of a second polymer and a third material, where the third material is a liquid crystal material, a liquid crystal polymer or a polymer.

Similarly, the concentric multilayer fiber and non-concentric multilayer fibers may be made of alternating layers with one of the layer types comprised of a first polymer and the second layer type comprised of a mixture of two polymers or materials which are not miscible. Upon processing in those cases, alternating layers are produced with some layers comprising the first polymer and some other layers comprising both a dispersed phase and a continuous phase. Preferably, one or both of the continuous phase and the dispersed phase are birefringent. With subsequent processing or orientation, the dispersed phase in the second type of layers can assume rod-like or layered structures.

The size requirements for the scattering fibers or birefringent regions in a layered fiber are similar among all the various embodiments. The size of the fiber or thickness of a layer in a multilayer device will need to be scaled up or down appropriately to achieve the desired size scale for the systems comprising layers or fibers containing a continuous and disperse phase, dependent on the desired operating wavelength or wavelength range.

Figure 9:
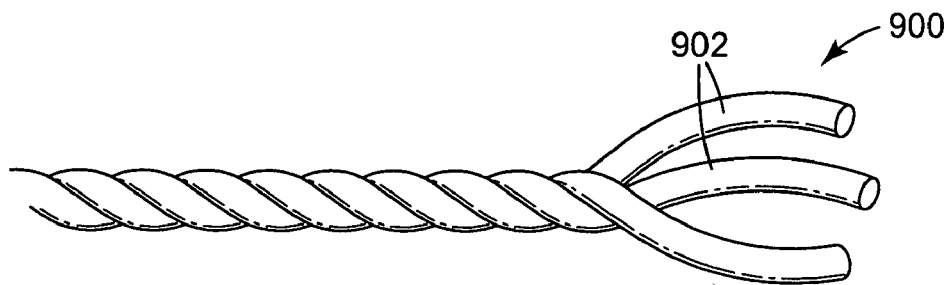
FIG. 9 schematically illustrates a polymer fiber yarn for use in a polarizer according to principles of the present invention.

Another type of polymer fiber that may be used in a polarizer of the present invention is now described with reference to FIG. 9. The fiber is formed as a yarn 900. In some embodiments of the yarn 900, the fiber is formed of a number of birefringent polymer fibers 902 twisted together, for example by twisting together a number of multilayer fibers, disperse phase fibers, composite fibers, and/or disperse phase composite fibers. The yarn 900 may be formed by twisting oriented fibers together to form the yarn, or may be formed by twisting isotropic fibers together, where the fibers are made of an orientable material, and then stretching the yarn 900 to orient the orientable material.

The yarn 900 is not restricted to containing only the birefringent polymer fibers, and may also include other fibers, for example fibers of other polymeric materials, isotropic or birefringent; natural fibers, such as cotton, silk or hemp; and inorganic fibers such as glass, glass-ceramic, or ceramic fibers.

The yarn 900 may include fiber or lengths of fiber comprised of glass, ceramic, and/or glass-ceramic materials. Glass-ceramic materials generally comprise 95-98 volume percent of very small crystals, with a size generally smaller than 1 micron. Some glass-ceramic materials have a crystal size as small as 50 nm, making them effectively transparent at visible wavelengths, since the crystal size is so much smaller than the wavelength of visible light. These glass-ceramics can also have very little, or no, effective difference between the refractive index of the glassy and crystalline regions, making them visually transparent. In addition to the transparency, glass-ceramic materials can have a rupture strength exceeding that of glass, and are known to have coefficients of thermal expansion of zero or that are even negative in value. Glass-ceramics of interest have compositions including, but not limited to, $Li_2O$—$Al_2O_3$—$SiO_2$, $CaO$—$Al_2O_3$—$SiO_2$, $Li_2O$—$MgO$—$ZnO$—$Al_2O_3$—$SiO_2$, $Al_2O_3$—$SiO_2$, and $ZnO$—$Al_2O_3$—$ZrO_2$—$SiO_2$, $Li_2O$—$Al_2O_3$—$SiO_2$, and $MgO$—$Al_2O_3$—$SiO_2$.

Some ceramics also have crystal sizes that are sufficiently small that they can appear transparent if they are embedded in a matrix polymer with an index of refraction appropriately matched. The Nextel™ Ceramic fibers, available from 3M Company, St. Paul, Minn., are examples of this type of material, and are already available as thread, yarn and woven mats. Suitable ceramic or glass-ceramic materials are described further in *Chemistry of Glasses*, $2^{nd}$ Edition (A. Paul, Chapman and Hall, 1990) and *Introduction to Ceramics*, $2^{nd}$ Edition (W. D. Kingery, John Wiley and Sons, 1976), the relevant portions of both of which are incorporated herein by reference.

The yarn 900 may include lengths of fiber, commonly referred to as staple fiber, that do not extend over the entire length of the yarn 900. The yarn 900 may be encapsulated within the polymer matrix, with the matrix filling the spaces between the fibers 902 that comprise the yarn 900. In other embodiments, the yarn 900 may have a filler between the fibers 902.

Suitable birefringent polymer materials for use in the yarn 900 include, but are not limited to, polymers including PET, PEN, copolymers containing terephthalates, naphthalates, or both. In other approaches, the yarn 900 may include birefringent fibers, such as multilayer or composite fibers, twisted together.

In general, the birefringent interfaces of the polymer fibers are elongated, extending in a direction along the fibers. In some exemplary embodiments, the birefringent fibers lie parallel to the x-axis, and so the diffusely reflected light is scattered mostly into the plane perpendicular to the fibers, the y-z plane, and there is little scattering in the x-z-plane.

One approach to fabricating a polarizer according to the present invention is now discussed with reference to FIGS. 10A-10D. Polymer fibers 1002 are laid on a first polymer layer 1004, as schematically illustrates in FIG. 10A. A second polymer layer 1006 may be cast over the polymer fibers 1002, FIG. 10B. The first polymer layer 1004 and the second polymer layer 1006 may be of the same polymer material, or may be different materials. If necessary, the second polymer 1006 layer may be infiltrated into the fibers 1002 through a variety of methods, for example, heat and pressure, solvent coating and drying, in-situ polymerization, or a combination thereof.

Figure 11:
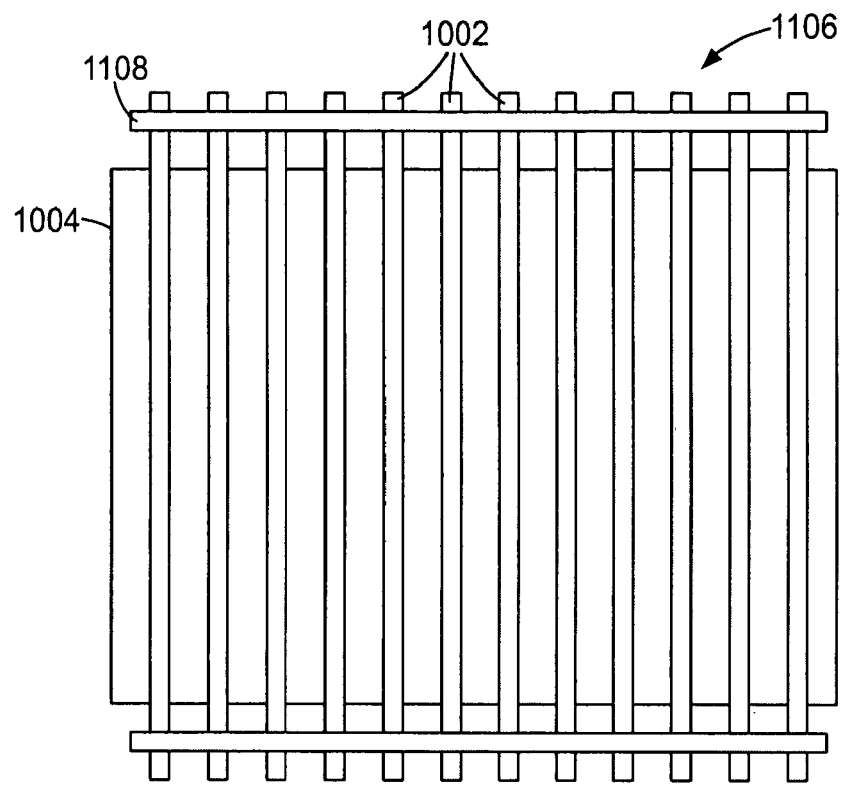
FIG. 11 schematically illustrates a fiber tow used in an embodiment of a method of fabricating a polymer-fiber optical element according to principles of the present invention.

The fibers 1002 may be laid individually, and may comprise a stack of fibers having a height the same as or greater than the width of an individual polymer fiber, or may be laid as one or more tows. A tow is an arrangement of fibers that are not twisted together. The fibers 1002 may be composite fibers, multilayer fibers, fiber yarn, any other suitable type of fibers, or a combination thereof. In particular, the tow or tows may form a set of fibers that are substantially parallel to each other. An embodiment of a fiber tow 1106 is schematically illustrated in FIG. 11. Cross-members 1108 may be present to provide support to the polymer fibers 1002 and to keep the polymer fibers 1002 at a desired spacing relative to their neighbors. Cross-members 1108 need not be present, for example if the polymer fibers 1002 are laid over the first polymer layer 1004 in a continuous process.

Figure 12:
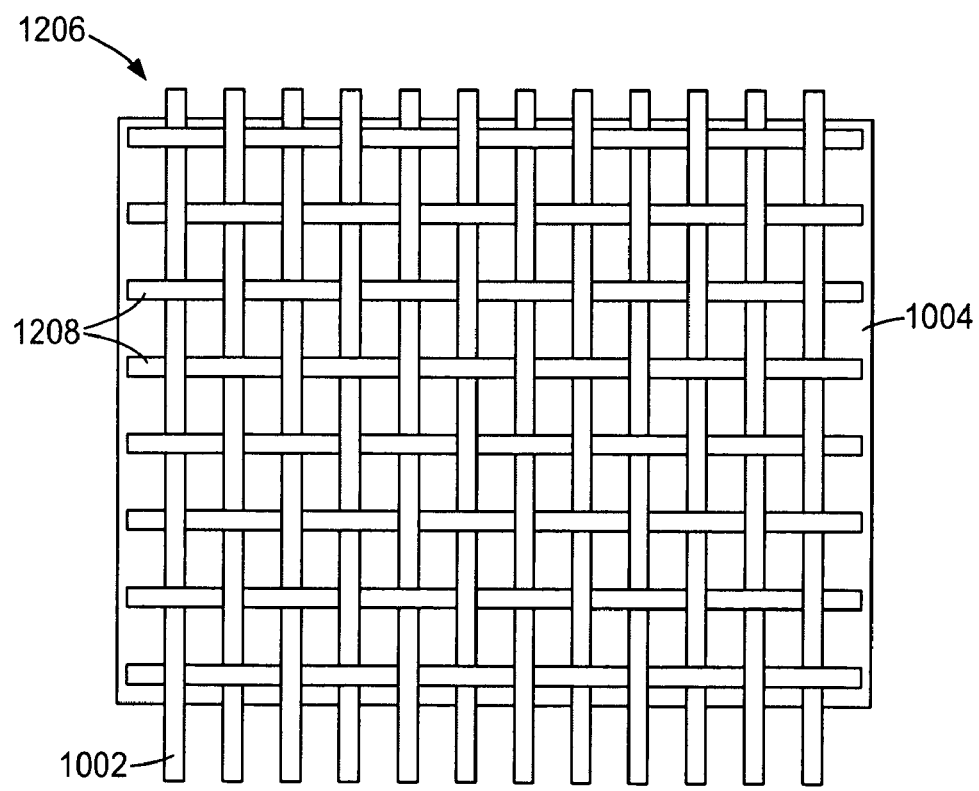
FIG. 12 schematically illustrates a fiber weave used in an embodiment of a method of fabricating a polymer-fiber optical element according to principles of the present invention.

The fibers 1002 may also be laid on the first layer 1004 as part of one or more weaves. A weave 1206 is schematically illustrated in FIG. 12 in which the polymer fibers 1002 form the warp and cross-fibers 1208 form the weft. The cross-fibers 1208 may be made of any suitable fiber material, organic or inorganic, and may be, for example, polymer fibers, such as isotropic and/or birefringent polymer fibers, or natural fibers, such as cotton, silk and hemp. In other exemplary embodiments, the cross fibers 1208 may be glass fibers, for example E-glass or S-glass fibers, glass-ceramic fibers or ceramic fibers as discussed above. The refractive index of the cross-fibers 1208 may be substantially matched to that of the surrounding polymer matrix so that the cross-fibers have a reduced optical effect on light passing within the polarizer. In addition, not all of the warp fibers need be polymer fibers containing birefringent interfaces. For example, some of the warp fibers may also be isotropic fibers, and may be formed of the same type of fiber as the cross-fibers. In some embodiments the warp fibers 1002 may be fibers having birefringent interfaces that are effective for reflecting or scattering light one polarization of light in one particular wavelength band. The cross-fibers 1208 may be fibers having birefringent interfaces effective for reflecting or scattering light one polarization of light in another particular wavelength band.

The weave may be formed using any suitable weaving process. For example, the weave may be a plain weave, as illustrated, a twill weave, a satin weave, or some other kind of weave. In some exemplary embodiments, the birefringent fibers 1002 are relatively flat within the weave, for example as shown schematically in the partial cross-section in FIG. 13A. Note that this figure conforms to the convention that the birefringent fibers 1002 lie substantially parallel to the x-direction. In some exemplary embodiments, the polymer fiber, such as a composite fiber or a multilayered fiber, maintains a single orientation in the weave, without being twisted.

Figure 13A:
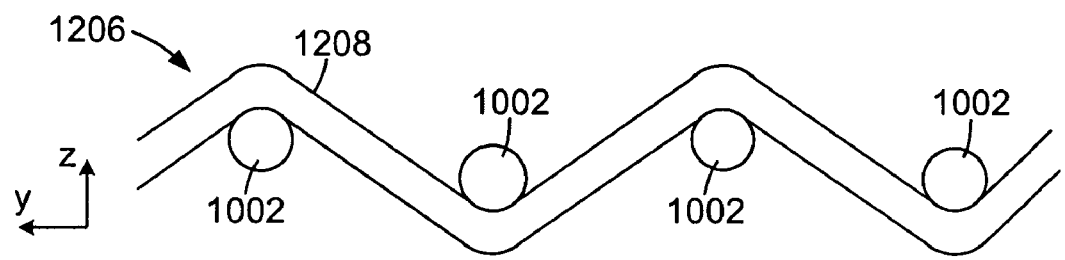
FIGS. 13A and 13B schematically illustrate cross-sectional views of embodiments of a polymer fiber weave as may be used in a polymer-fiber optical element according to principles of the present invention.
Figure 13B:
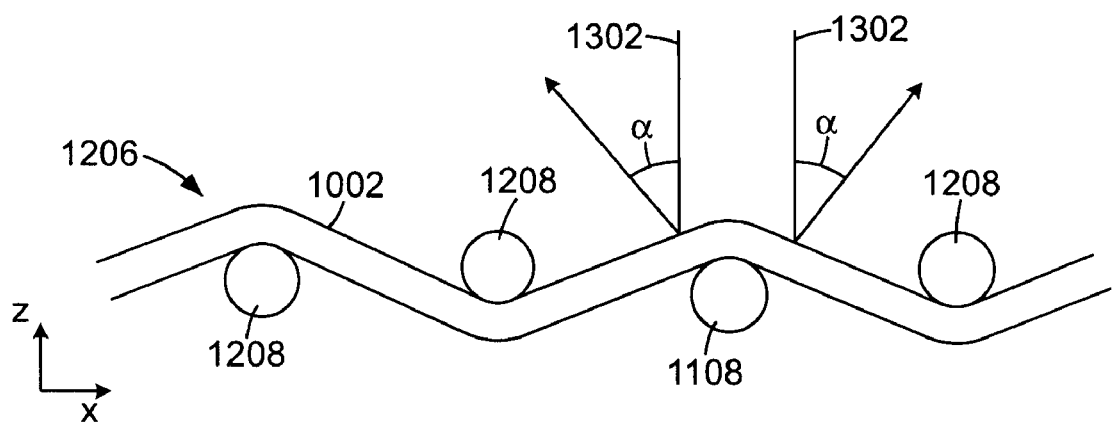

In other embodiments, the polymer fibers 1002 need not be flat within the weave. An exemplary partial cross-section in such a weave 1206 is schematically illustrated in FIG. 13B. It is important to note that the view in this figure is different from that of FIG. 13A. FIG. 13A, shows the side of the cross-fiber 1208, whereas FIG. 13B shows the side of the polymer fiber 1002. The coordinate axes conform to the convention used in earlier figures, so the polymer fiber 1002 lies generally in a direction parallel to the x-axis. Since the polymer fiber 1002 undulates within the weave 1206, however, the birefringent interfaces of the polymer fiber 1002 do not all lie exactly parallel to the x-axis. Accordingly, the light reflected or scattered by the fiber 1002 may be scattered at different angles in the x-z plane. In the illustration, light 1302 is incident on the fiber 1002 in a direction perpendicular to the x-axis, and a portion of the light 1302 is reflected through an angle, $\alpha$, with a component in the positive x-direction or negative x-direction, depending on whether the light 1302 is incident on the polymer fiber 1002 at a "downslope" or "upslope". Thus, the polymer fiber 1002 may also diffuse the reflected light in the x-z plane. The degree of diffuse reflection in the x-z plane depends on the shape of the polymer fiber 1002 within the weave: the more that portions of the polymer fiber 1002 depart from being parallel to the x-direction, the greater the angular distribution of the light in the x-z plane.

The polymer fibers 1002 may also be provided as a non-woven, as chopped fiber or as a chopped fiber mat.

The polarizer may be formed in a batch process, or in a continuous process. In a continuous process, the birefringent fiber 1002, preferably in a tow or weave, is laid onto the first polymer layer 1004 and then the second polymer layer 1006 may be continuously cast over the birefringent fiber 1002. The second layer 1006 may be then be cured or allowed to set.

Figure 10A:
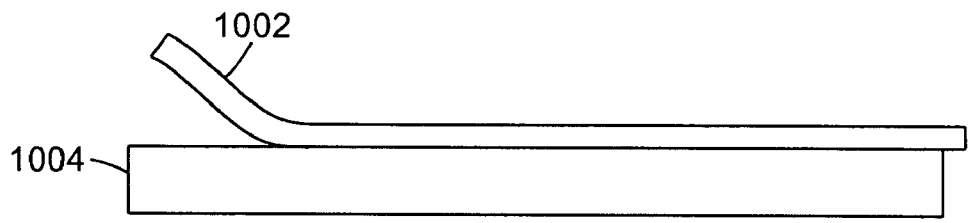
FIGS. 10A-10D schematically illustrate steps in an embodiment of a method of fabricating a polymer-fiber optical element according to principles of the present invention.
Figure 10B:
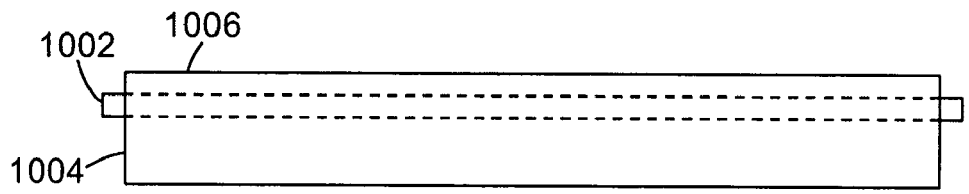
Figure 10C:
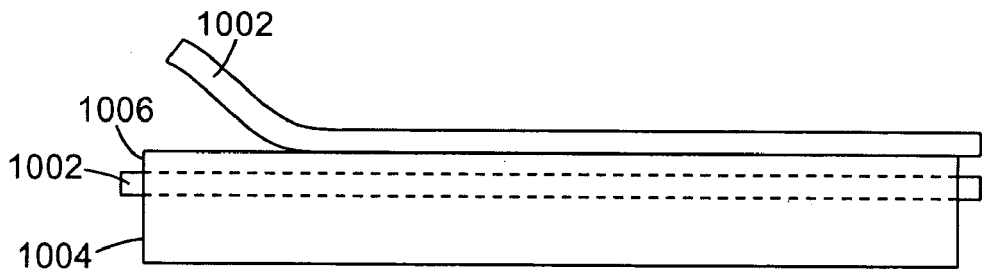
Figure 10D:
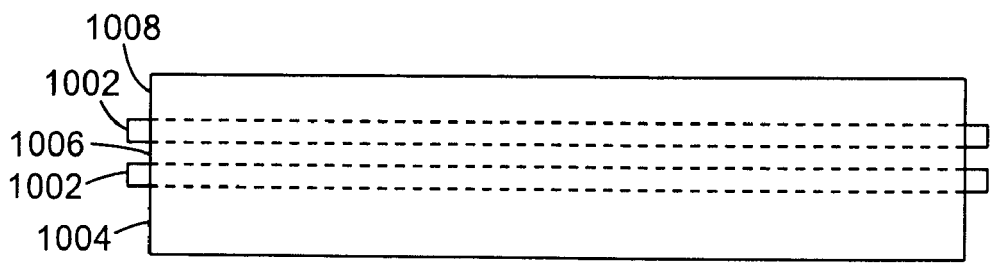

If desired, additional layers of polymer fiber 1002 may be added, along with subsequent layers of polymer material 1008. For example, FIGS. 10C and 10D show the addition of a set of polymer fibers 1002 over the second polymer layer 1006, and the application of a third polymer layer 1008.

The first polymer layer 1004 may be a thermoplastic polymer or a thermoset-type polymer. The second and subsequent polymer layers 1006 and 1008 can also be either thermoplastic or thermoset-type polymers. Thermoplastic polymers can be applied to the previous polymer layer 1004 and infiltrated into the fiber 1002 through a variety of methods including heat and pressure, solvent coating and drying, or in-situ polymerization. Thermoset-type polymers can be coated and cured onto the fiber 1002 and previous polymer layers 1004 and 1006 through exposure to pressure, heat, actinic radiation, and/or elapsed time.

In an alternative approach to fabricating a polarizer, a polymer film 1004 having certain desirable optical, physical, or surface properties can be used as a substrate onto which the fibers 1002 are laid. A thermoplastic or thermosetting resin or curable composition can be applied as the second polymer film 1006 to infiltrate the layer or layers of fiber 1002, and then a second substrate 1008 can be applied to create a sandwich-type structure around the fibers 1002 and the second polymer film 1006 of the resin or curable composition. The curable resin can then be cured, hardened, or reacted to form a laminate. In this case the substrates 1004, 1008 can be made from the same materials as the thermoplastic, thermosetting resin or curable composition, or it can be made from different materials. A broad range of pressure sensitive adhesives and hot melt adhesives may be used in place of the thermoplastic or thermosetting resin or curable composition for the second layer 1006. In some embodiments, the first and second substrates 1004, 1008 may be intimately attached to the thermoplastic or thermo-setting resin or curable composition 1006 containing the fibers 1002. In other embodiments, the first and second substrates 1004, 1008 can be removable.

In another exemplary approach to fabricating a polarizer having more than a single layer of birefringent fibers, two or more layers of fibers may be laid on top of a first polymer layer, and then a second layer of polymer material is cast over the fibers as the polymer matrix in a single step.

In another exemplary method of fabricating a polarizer with composite fibers, the filler of the composite fibers may be removed, for example by dissolving in a solvent, before the composite fibers are embedded within the polymer matrix. The polymer matrix may then be used as the filler between the scattering fibers of the composite fiber. This method may be particularly useful when the composite fibers are provided in a tow or in a weave.

Suitable methods for producing composite fibers include extruding composite fibers with birefringent scattering fibers and a soluble filler. Suitable water soluble fillers include polyvinylpyrrolidinone, cellulose acetate, and polyvinyl alcohol. Suitable polyvinyl alcohol includes that made from polyvinylacetate that is hydrolyzed to a degree of about 70 to 95%.

The scattering fibers may be extruded in an array, oriented by heating the extruded array and applying suitable tension such that the scattering fibers are stretched to give a stretch ratio that results in the desired values of refractive index.

Oriented arrays of scattering fibers, forming the composite fibers, may be formed into yarns. The yarns may optionally also incorporate other types of fibers. The yarns are preferably oriented in a single direction by forming a tow of fibers or by weaving the fibers to form a fabric. The soluble polymer filler may be removed by washing the yarns at any stage of manufacture after extrusion.

The washed scattering fibers may be infiltrated with a fluid, preferably a curable resin fluid. Any suitable technique may be used to harden the resin, for example the resin may thermally and/or radiation cured to form the matrix that contains the fibers. In some exemplary embodiments, the resin is cured so that the matrix has flat surfaces. In other exemplary embodiments, the resin may be cured to have a desired structure on one or more surfaces. For example, the resin may be cured while it has a surface in contact with the microstructured surface of a microreplication tool. Examples of suitable microstructured surfaces include machined metal surfaces, electroformed replicas, or molded polymer films. Examples of suitable microstructures formed on the matrix surface include linear prismatic structures, non-linear prismatic structures, Fresnel surfaces, microlenses and the like.

Some embodiments of the invention may be used in, for example, liquid crystal display (LCD) systems and other polarized display systems. For example, a reflective, fiber-based, polarizer of the type discussed above may be used to polarize light propagating to an LCD panel in the backlight of an LCD system. Such systems include, but are not limited to, LCD-TVs and LCD monitors, cell-phone displays and other electronic equipment, such as digital still and video cameras, that display information to a user using an LCD panel.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical body, comprising:
a polymer matrix; and
a plurality of polymer fibers disposed within the polymer matrix, wherein at least one of the polymer fibers comprises multiple birefringent interfaces for reflecting light, the birefringent interfaces being formed between a first polymer material and a second polymer material, at least one of the first and second polymer materials being birefringent, the birefringent interfaces being internal to the at least one of the polymer fibers and are elongated along an axis of the at least one polymer fiber, the polymer fibers being oriented substantially parallel to a first axis, a refractive index difference at the birefringent interfaces for light polarized parallel to the first axis being different from a refractive index difference at the birefringent interfaces for light polarized parallel to a second axis, the second axis being orthogonal to the first axis.

2. An optical body as recited in claim 1, wherein the second polymer material is an optically isotropic polymer material.

3. An optical body as recited in claim 1, wherein the polymer fibers comprise at least one composite fiber, the at least one composite fiber comprising a plurality of scattering polymer fibers formed of the first polymer material embedded within the second polymer material.

4. An optical body as recited in claim 3, wherein at least some of the scattering polymer fibers are arranged in a regular pattern in a cross-section through the composite fiber.

5. An optical body as recited in claim 3, wherein at least some of the scattering polymer fibers are arranged irregularly in a cross-section through the composite fiber.

6. An optical body as recited in claim 3, wherein at least one of the scattering fibers comprises a disperse phase of a third polymer material in a continuous phase of the second polymer material.

7. An optical body as recited in claim 1, wherein the polymer fibers comprise polymer fiber yarn.

8. An optical body as recited in claim 1, wherein the polymer fibers comprise alternating layers of the first and second polymer materials.

9. An optical body as recited in claim 8, wherein the layers of the first and second polymer materials are substantially planar.

10. An optical body as recited in claim 8, wherein the layers of the alternating first and second polymer materials are arranged concentrically.

11. An optical body as recited in claim 10, wherein the layers of the alternating first and second polymer materials are circularly concentric.

12. An optical body as recited in claim 8, wherein the layers of the alternating first and second polymer materials are surrounded by a cover layer.

13. An optical body as recited in claim 12, wherein the cover layer is formed of one of the first and second polymer materials.

14. An optical body as recited in claim 8, wherein the birefringent interfaces formed by the layers of the alternating first and second polymer materials are oriented, in different fibers, in random directions.

15. An optical body as recited in claim 8, wherein the birefringent interfaces formed by the layers of the alternating first and second polymer materials are oriented, in different fibers, in selected directions.

16. An optical body as recited in claim 1, wherein the polymer fibers comprise at least one disperse phase fiber, the disperse phase fiber comprising a disperse phase of the first polymer material in a continuous phase of the second polymer material.

17. An optical body as recited in claim 1, wherein at least one of the polymer fibers has a cover layer.

18. An optical body as recited in claim 1, further comprising a fiber weave disposed within the polymer matrix, the fiber weave comprising the plurality of polymer fibers.

19. An optical body as recited in claim 18, wherein the plurality of polymer fibers comprise one of the warp and the weft of the fiber weave.

20. An optical body as recited in claim 19, wherein the other of the warp and the weft of the fiber weave comprises optically isotropic polymer fibers.

21. An optical body as recited in claim 19, wherein the other of the warp and the weft of the fiber weave comprises optically isotropic natural fibers.

22. An optical body as recited in claim 19, wherein the other of the warp and the weft of the fiber weave comprises at least one of glass fibers, glass-ceramic fibers and ceramic fibers.

23. An optical body as recited in claim 19, wherein the other of the warp and the weft of the fiber weave comprises isotropic fibers having a refractive index substantially similar to the refractive index of the polymer matrix.

24. An optical body as recited in claim 18, wherein the polymer fibers in the fiber weave are substantially straight.

25. An optical body as recited in claim 1, further comprising a non-woven disposed within the polymer matrix, the non-woven comprising the plurality of polymer fibers.

26. An optical body as recited in claim 1, further comprising a chopped fiber mat disposed within the polymer matrix, the chopped fiber mat comprising the plurality of polymer fibers.

27. An optical body as recited in claim 1, further comprising chopped fiber disposed within the polymer matrix, the chopped fiber comprising the plurality of polymer fibers.

28. An optical body as recited in claim 1, wherein the polymer matrix is formed as a layer containing the plurality of polymer fibers, the layer having substantially flat and parallel surfaces.

29. An optical body as recited in claim 1, wherein the polymer matrix is formed as a layer having at least one structured surface.

30. An optical body as recited in claim 29, wherein the at least one structured surface provides optical power to light transmitted through the body.

31. An optical body as recited in claim 29, wherein the at least one structured surface comprises an array of prismatic structures.

32. An optical body as recited in claim 1, wherein the polymer matrix has a first refractive index and the first polymer material is birefringent, having an ordinary refractive index substantially the same as the first refractive index for light polarized orthogonally to the first axis and has an extraordinary refractive index different from the first refractive index for light polarized parallel to the first axis.

33. An optical body as recited in claim 32, wherein the extraordinary refractive index is greater than the ordinary refractive index.

34. An optical body, comprising:
an optical material having a first refractive index, $n_x$, along a first axis and a second refractive index, $n_y$, along a second axis perpendicular to the first axis; and
elongated polymer fibers disposed within the optical material parallel to the first axis, the polymer fibers comprising a first birefringent material elongated along the first axis and having a refractive index, $n_{1x}$, along the first axis and a refractive index $n_{1y}$ along the second axis, where $n_{1x}$ is different from $n_{1y}$, the elongated polymer fibers comprising a second material elongated along the first axis and having a refractive index $n_{2x}$ along the first axis and a refractive index $n_{2y}$ along the second axis, the optical body scattering incident light polarized along the first axis differently than incident light polarized along the second axis.

35. A body as recited in claim 34, wherein $n_x$ is substantially equal to $n_y$.

36. A body as recited in claim 34, wherein $n_{2x}$ is substantially equal to $n_{2y}$.

37. A body as recited in claim 34, wherein $n_x$ is substantially equal to $n_{2x}$.

38. A body as recited in claim 34, wherein the light is scattered at least within the elongated polymer fibers at interfaces between the first birefringent material and the second material.

* * * * *

UNITED STATES PATENT AND TRADEMARK OFFICE
CERTIFICATE OF CORRECTION

PATENT NO. : 7,356,229 B2
APPLICATION NO. : 11/068157
DATED : April 8, 2008
INVENTOR(S) : Andrew J. Ouderkirk It is certified that error appears in the above-identified patent and that said Letters Patent is hereby corrected as shown below:

Title Page
Item [56], References Cited, OTHER PUBLICATIONS, After "D," delete ";".
Item [56], References Cited, OTHER PUBLICATIONS, Delete "Microgibrillar" and insert -- Microfibrillar --, therefor.

Column 1
Line 8, Delete "herewith;" and insert -- herewith, having attorney docket no. 60371US002; --, therefor.
Line 11, After "herewith" insert -- and having attorney docket no. 60401US002 --.
Line 13, After "herewith" insert -- and having attorney docket no. 60622US002 --.
Line 14, After "pending" insert -- , --.
Line 15, After "herewith" insert -- and having attorney docket no. 60623US002 --.
Line 18, After "herewith" insert -- and having attorney docket no. 60624US002, --.

Column 5
Line 31, Delete "nonwoven" and insert -- non-woven --, therefor.
Line 32, Delete "nonwoven" and insert -- non-woven --, therefor.

Column 6
Line 59, Delete "PM MA" and insert -- PMMA --, therefor.

Column 7
Line 5, Delete "napthalates" and insert -- naphthalates --, therefor.

Column 17
Line 23, Delete "two dimensional" and insert -- two-dimensional --, therefor.
Line 29, Delete "two dimensional" and insert -- two-dimensional --, therefor.
Line 64, After "herewith," insert -- having attorney docket no. 60371US002, --.

Column 19
Line 12, Delete "herewith." and insert -- herewith, having attorney docket no. 60371US002. --, therefor.

UNITED STATES PATENT AND TRADEMARK OFFICE
CERTIFICATE OF CORRECTION

| | | |
|---|---|---|
| PATENT NO. | : 7,356,229 B2 | Page 2 of 2 |
| APPLICATION NO. | : 11/068157 | |
| DATED | : April 8, 2008 | |
| INVENTOR(S) | : Andrew J. Ouderkirk | |

It is certified that error appears in the above-identified patent and that said Letters Patent is hereby corrected as shown below:

<u>Column 22</u>
Line 3, After "PHASES"," insert -- attorney docket no. 60401US002, --.

Signed and Sealed this

Sixteenth Day of September, 2008

JON W. DUDAS
*Director of the United States Patent and Trademark Office*